United States Patent
Tai et al.

(10) Patent No.: US 6,599,598 B1
(45) Date of Patent: Jul. 29, 2003

(54) OXYGEN ABSORPTIVE RESIN COMPOSITION

(75) Inventors: Shinji Tai, Kurashiki (JP); Hiroyuki Shimo, Kurashiki (JP); Masakazu Nakaya, Kurashiki (JP); Hideo Takamatsu, Kashima-gun (JP); Mizuho Maeda, Kashima-gun (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/518,247

(22) Filed: Mar. 3, 2000

(30) Foreign Application Priority Data

| Mar. 3, 1999 | (JP) | 11-055264 |
| Jun. 8, 1999 | (JP) | 11-161190 |
| Jun. 8, 1999 | (JP) | 11-161191 |
| Jul. 27, 1999 | (JP) | 11-212086 |
| Aug. 2, 1999 | (JP) | 11-218669 |
| Aug. 3, 1999 | (JP) | 11-220288 |

(51) Int. Cl.$^7$ .................... B29C 51/00
(52) U.S. Cl. ............ 428/36.6; 428/36.7; 428/220; 428/482; 525/57; 525/61; 525/360; 525/370
(58) Field of Search ............ 525/61, 370, 360, 525/57; 428/36.6, 36.7, 220, 483

(56) References Cited

U.S. PATENT DOCUMENTS

| 5,021,515 A | 6/1991 | Cochran et al. | 525/371 |
| 5,346,644 A | 9/1994 | Speer et al. | 252/188.28 |
| 5,492,742 A | 2/1996 | Zenner et al. | 428/35.2 |
| 5,648,020 A | 7/1997 | Speer et al. | 252/188.28 |
| 5,700,554 A | 12/1997 | Speer et al. | 428/220 |
| 6,254,946 B1 * | 7/2001 | Hirata et al. | 428/35.2 |

FOREIGN PATENT DOCUMENTS

| EP | 599356 A1 * | 6/1994 |
| EP | 0 854 166 A2 | 7/1998 |
| JP | 56-118439 | 9/1981 |
| JP | 4-45144 | 2/1992 |
| JP | 4-211444 | 8/1992 |
| JP | 5-156095 | 6/1993 |
| JP | 5-170980 | 7/1993 |
| JP | 10-259301 | 9/1998 |

* cited by examiner

Primary Examiner—Sandra M. Nolan
(74) Attorney, Agent, or Firm—Oblon, Spivak, McClelland, Maier & Neustadt, P.C.

(57) ABSTRACT

The oxygen resin composition of the present invention includes: a thermoplastic resin (a) having carbon-carbon double bonds; a gas barrier resin (b) having an oxygen transmission rate of 500 ml·20 $\mu$m/m$^2$·day·atm or less (20° C. 65% RH); and a transmission matel salt (c). This resin composition and molded articles formed using the resin composition effectively absorb and scavenge oxygen when used to package products susceptible to degradation by oxygen, such as foods and drinks.

17 Claims, 6 Drawing Sheets

OXYGEN ABSORPTIVE RESIN COMPOSITION

BACKGROUND OF THE INVENTION

1. Field of the Invention

The present invention relates to oxygen absorptive resins and resin compositions used for packaging materials, containers, and the like for products that are highly susceptible to degradation by oxygen, such as foods, drinks, medicines, cosmetics, and the like. The present invention also relates to oxygen absorptive resin compositions having good gas barrier properties, good moisture-resistance, good aroma retentivity, and good flavor barrier properties, in addition to good oxygen absorbency. The present invention further relates to molded articles using such resins or compositions, such as packaging materials, containers, and the like for foods, drinks, medicines, cosmetics, and the like.

2. Description of the Related Art

As well known, it is possible to maintain the quality of products susceptible to degradation by oxygen and prolong the shelf life thereof by protecting the products from exposure to oxygen. For example, a food liable to degrade in an oxygen atmosphere is maintained in quality and retarded from spoiling by packaging the food to block it from exposure to oxygen. Such packaging is also advantageous in prolonging the value of the product and thus reducing the cost that may be required for disposal of a degraded product and the repurchase of a new product. Several techniques for minimizing exposure to oxygen have been developed in the food packaging industry. Examples of such means generally available at present are modified atmosphere packaging (MAP), vacuum packaging, and oxygen barrier film packaging. The former two means utilize an atmosphere with a low concentration of oxygen, while the last means physically blocks oxygen from entering the packaged environment.

The oxygen barrier film packaging, which is classically most used, utilizes various types of gas barrier resins as a film material.

Extensively used gas barrier resins extensively are an ethylene-vinyl alcohol copolymer (hereinafter may be referred to as EVOH), polyamide, polyvinyl chloride, polyacrylonitrile, and the like. These resins have good oxygen or carbon dioxide gas barrier properties and can be melt-molded. They therefore have a wide range of applications such as packaging films, sheets, bottles, and containers. These resins are laminated with thermoplastic resins, in particular, polyolefin resins, having good moisture-resistance, mechanical properties, and the like, to form multilayered plastic packaging materials. Such multilayered plastic packaging materials are broadly used as containers that have excellent oxygen barrier properties in the form of bags, bottles, cups, and pouches, for example, in a variety of fields such as foods, cosmetics, medicines, chemicals, and toiletries.

The above packaging materials using the gas barrier resins have good barrier properties against oxygen and carbon dioxide gas. However, the permeability thereof against gas such as oxygen gas is not exactly zero or near zero, unlike metals used for cans and the like and glass used for bottles and the like, but still permit transmission of an amount of gas that is not negligible.

As for packaging materials for foods, in particular, of great concern is degradation of foods due to oxidation when they are preserved for an extended period of time. Therefore, improvement on the oxygen barrier properties of the resin materials is strongly desired. Also desired is scavenging of oxygen existing in a packaging container that has entered the container together with the contents during packaging and filling of the contents, when the contents are susceptible to oxidation, so as to protect them from being degraded. For this purpose, it is proposed to enclose an oxygen scavenger in the inner environment of the package, or to give the oxygen scavenging function to the gas barrier resin by mixing an oxygen scavenger in the gas barrier resin. The latter proposal of giving the oxygen scavenging function to the gas barrier resin, in particular, has an effect of scavenging oxygen uniformly over the entire inner environment of the package. Additionally, it also has an effect of scavenging oxygen that is being transmitted through the wall of the package by the scavenger mixed in the resin material. This makes it possible to minimize the level of oxygen content within the entire inner environment of the package.

Various compounds are known to be oxygen scavengers. As an improved oxygen scavenger, a composition including a transition metal catalyst and an ethylenically unsatarated compound (e.g., polybutadiene and polyisoprene) is proposed, for example, in Japanese Laid-Open Patent Publication No. 5-115776. This literature exemplifies trans-1,4-polyisoprene and 1,2-polybutadiene as the ethylenically unsatarated compound, and a cobalt compound as the transition metal catalyst. However, sufficient oxygen scavenging effect of the disclosed oxygen scavenger is not so sufficiently obtained. Moreover, in some cases, the delay until the start of effective oxygen scavenging (the induction period) is disadvantageously long.

As the method of giving the oxygen absorption function (i.e., scavenging function) to a gas barrier resin, the following methods are proposed: (1) An oxidation catalyst such as a transition metal is added to EVOH to facilitate oxidation of the EVOH so that oxygen can react with the EVOH as it is transmitted in a film composed of the EVOH, thereby giving the oxygen absorption function to the EVOH (Japanese Laid-Open Patent Publication No. 4-211444); (2) An oxidation catalyst such as a transition metal is added to polyvinyl chloride to facilitate oxidation of the polyvinyl chloride so that oxygen can react with the polyvinyl chloride as it is transmitted in a film composed of the polyvinyl chloride, thereby giving the oxygen absorption function to the polyvinyl chloride (Japanese Laid-Open Patent Publication No. 4-45144); (3) A mixture substantially composed of polyolefin and an oxidation catalyst is dispersed in EVOH so that oxygen can react with the polyolefin in the EVOH as it is transmitted in a film of EVOH containing the mixture, thereby obtaining a resin composition having the oxygen absorption function (Japanese Laid-Open Patent Publication No. 05-156095); and (4) EVOH, polyolefin, and an oxidation catalyst are blended so that oxygen can react with the polyolefin and the EVOH as it is transmitted in a film of the mixture of the EVOH and polyolefin, thereby obtaining a resin composition having the oxygen absorption function (Japanese Laid-Open Patent Publication No. 05-170980).

However, methods (1) and (2) fail to provide sufficiently improved oxygen barrier properties, though. Moreover, the transparency is not adequate due to the addition of the large amount of oxidation catalyst. Methods (3) and (4) also have a drawback in that the transparency is reduced due to the addition of polyolefin to the gas barrier resin.

SUMMARY OF THE INVENTION

The oxygen absorptive resin composition of the first embodiment of the present invention includes: a thermoplastic resin (a) having carbon-carbon double bonds; a gas barrier resin (b) having an oxygen transmission rate of 500 ml·20 μm/m²·day·atm or less (20° C. 65% RH); and a transition metal salt (c).

In a preferred embodiment, the oxygen absorption rate of the resin composition is 0.01 ml/m²·day or more.

The oxygen absorptive resin composition of the second embodiment of the present invention includes: a thermoplastic resin (a) having carbon-carbon double bonds; and a gas barrier resin (b) having an oxygen transmission rate of 500 ml·20 μm/m²·day·atm or less (20° C. 65% RH), wherein the oxygen absorption rate is 0.01 ml/m²·day or more.

In a preferred embodiment, the thermoplastic resin (a) of the oxygen absorptive resin composition has the carbon-carbon double bonds in an amount of 0.0001 eq/g or more.

In another preferred embodiment, the thermoplastic resin (a) is a copolymer of an aromatic vinyl compound and a diene compound.

In still another preferred embodiment, the thermoplastic resin (a) has at least one kind of structural unit represented by formula (I):

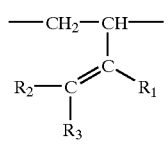
(I)

[wherein $R_1$ denotes an alkyl group having 1 to 10 carbon atoms, an aryl group, an alkylaryl group, or an alkoxy group; $R_2$ and $R_3$ denote independently a hydrogen atom, an alkyl group having 1 to 10 carbon atoms, a substituted aryl group or a non-substituted aryl group, —$COOR_4$, —$OCOR_5$, a cyano group, or a halogen atom; and $R_4$ and $R_5$ denote independently an alkyl group having 1 to 10 carbon atoms, an aryl group, an alkylaryl group, or an alkoxy group], and has a number-average molecular weight in the range of 1000 to 500000.

In still another preferred embodiment, the refractive index of the gas barrier resin (b) is in the range of 1.50 to 1.56.

In still another preferred embodiment, the gas barrier resin (b) is at least one selected from the group consisting of polyvinyl alcohol resins, polyamides, polyvinyl chloride, and polyacrylonitrile.

In still another preferred embodiment, the gas barrier resin (b) is an ethylene-vinyl alcohol copolymer having an ethylene content of 5 to 60 mol % and a degree of saponification of 90% or more.

In still another preferred embodiment, the transition metal salt (c) is at least one selected from the group consisting of iron salts, nickel salts, copper salts, manganese salts, and cobalt salts.

In still another preferred embodiment, the transition metal salt (c) is contained in an amount of 1 to 5000 ppm in terms of the metal element.

In still another preferred embodiment, the difference in the refractive index between the thermoplastic resin (a) and the gas barrier resin (b) is 0.01 or less.

In still another preferred embodiment, the thermoplastic resin (a) is contained in an amount of 0.1 to 30% by weight, and the gas barrier resin (b) is contained in an amount of 99.9 to 70% by weight.

In still another preferred embodiment, particles of the thermoplastic resin (a) are dispersed in a matrix of the gas barrier resin (b).

The oxygen absorptive resin composition of the third embodiment of the present invention includes: a thermoplastic resin (a) having a number-average molecular weight in the range of 1000 to 500000 and having at least one kind of a structural unit represented by formula (I):

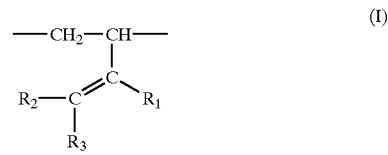

[wherein $R_1$ denotes an alkyl group having 1 to 10 carbon atoms, an aryl group, an alkylaryl group, or an alkoxy group; $R_2$ and $R_3$ denote independently a hydrogen atom, an alkyl group having 1 to 10 carbon atoms, a substituted aryl group or a non-substituted aryl group, —$COOR_4$, —$OCOR_5$, a cyano group, or a halogen atom; and $R_4$ and $R_5$ denote independently an alkyl group having 1 to 10 carbon atoms, an aryl group, an alkylaryl group, or an alkoxy group], wherein the carbon-carbon double bonds in said structural unit in the resin (a) is contained in an amount of 0.0001 eq/g or more; and a transition metal salt (c) in an amount of 1 to 10000 ppm in terms of the metal element.

In a preferred embodiment, the oxygen absorption rate of the resin composition of the third embodiment is 0.01 ml/m²·day or more.

In another preferred embodiment, in the above formula (I), $R_1$ denotes a methyl group, and $R_2$ and $R_3$ denote a hydrogen atom independently.

In still another preferred embodiment, the thermoplastic resin (a) has a structural unit derived from an aromatic vinyl compound.

In still another preferred embodiment, the thermoplastic resin (a) is mainly composed of a polyisoprene block containing the structural unit represented by the formula (I) and a polystyrene block.

In still another preferred embodiment, the thermoplastic resin (a) is a ternary block copolymer composed of polystyrene block—polyisoprene block containing the structural unit represented by the formula (I)—polystyrene block.

In still another preferred embodiment, the resin composition of the third embodiment further includes a thermoplastic resin other than the thermoplastic resin (a).

In still another preferred embodiment, the thermoplastic resin other than the thermoplastic resin (a) is a gas barrier resin (b) having an oxygen transmission rate of 500 ml·20 μm/m²·day·atm or less (20° C. 65% RH).

In still another preferred embodiment, particles of the thermoplastic resin (a) contained in the resin composition of the third embodiment are dispersed in a matrix of the gas barrier resin (b).

The present invention also provides an oxygen absorptive thermoplastic resin having a number-average molecular weight in the range of 1000 to 500000, having at least one kind of structural units represented by formula (I):

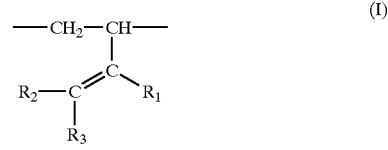

[wherein $R_1$ denotes an alkyl group having 1 to 10 carbon atoms, an aryl group, an alkylaryl group, or an alkoxy group;

$R_2$ and $R_3$ denote independently a hydrogen atom, an alkyl group having 1 to 10 carbon atoms, a substituted aryl group or a non-substituted aryl group, —COOR$_4$, —OCOR$_5$, a cyano group, or a halogen atom; and $R_4$ and $R_5$ denote independently an alkyl group having 1 to 10 carbon atoms, an aryl group, an alkylaryl group, or an alkoxy group], wherein the carbon-carbon double bonds in said structural unit in the resin (a) is contained in an amount of 0.0001 eq/g or more, and having an oxygen absorption rate of 0.01 ml/m$^2$·day or more.

The present invention provides a molded article including the oxygen absorptive resin composition or the oxygen absorptive thermoplastic resin described above.

The present invention also provides a multilayered structure having a layer including the oxygen absorptive resin composition or the oxygen absorptive thermoplastic resin described above.

The present invention further provides a multilayered container having a layer including the oxygen absorptive resin composition or the oxygen absorptive thermoplastic resin described above.

The present invention further provides a multilayered container including a multilayered film having a layer made of the oxygen absorptive resin composition or the oxygen absorptive thermoplastic resin described above, wherein the multilayered film has a total thickness of 300 μm or less.

The present invention further provides a multilayered container having a layer made of the oxygen absorptive resin composition or the oxygen absorptive thermoplastic resin described above, and a layer made of thermoplastic polyester.

The present invention further provides a cap equipped with a gasket made of the oxygen absorptive resin composition or the oxygen absorptive thermoplastic resin described above.

Thus, the invention described herein makes possible the advantages of: (1) providing a composition having an excellent effect of scavenging or absorbing oxygen when used for packaging of products that are highly susceptible to degradation by oxygen, such as foods, drinks, medicines, and cosmetics; (2) providing an oxygen absorptive resin composition excellent in gas barrier properties, transparency, moisture-resistance, aroma retentivity, and flavor barrier properties, in addition to the effect of scavenging or absorbing oxygen; (3) providing a resin having the above properties; and (4) providing a molded article including the above resin or composition, which is excellent in oxygen absorbance, gas barrier properties, and the like.

DESCRIPTION OF THE PREFERRED EMBODIMENTS

Figure 1:
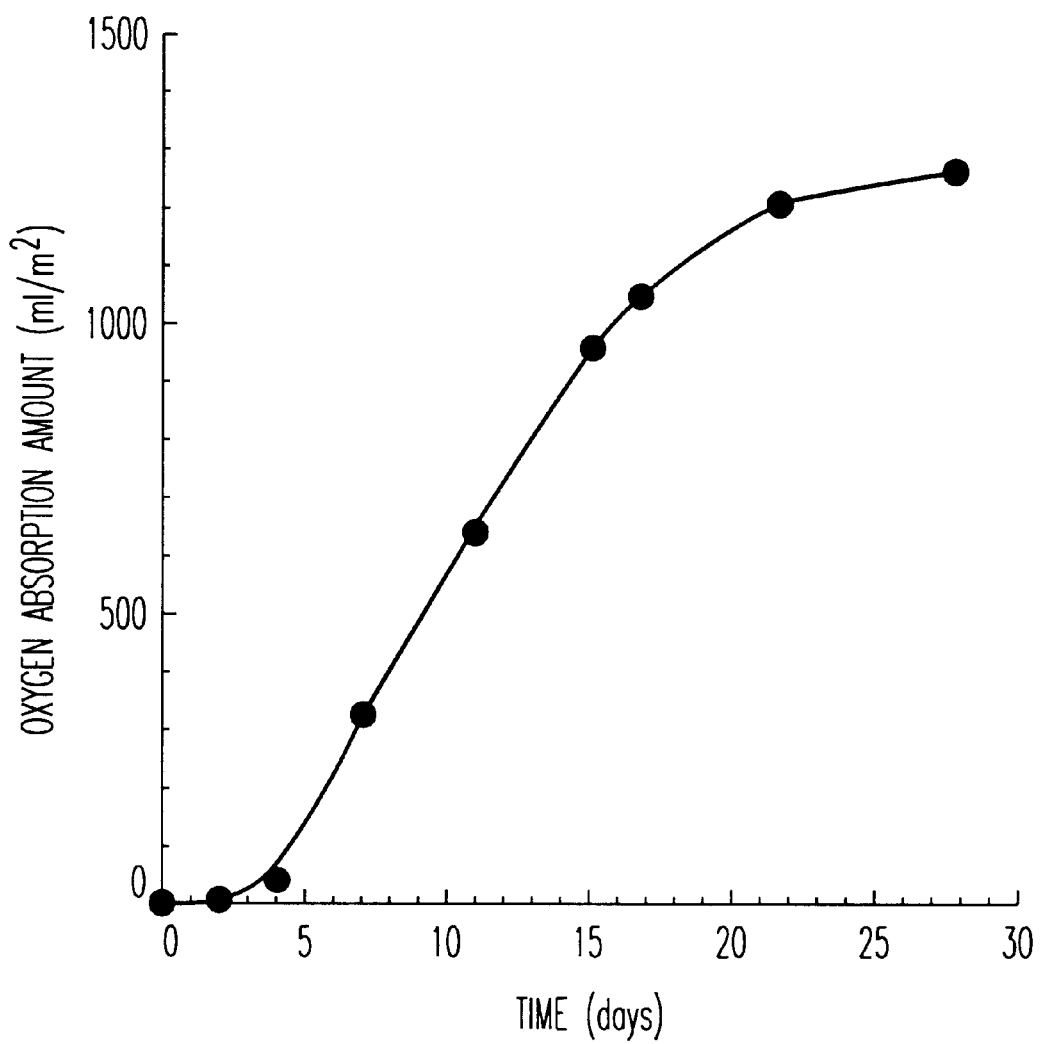
FIG. 1 is a graph plotting the oxygen absorption amount of a single-layer film of Example 1 with respect to time.

As used herein, "scavenging" oxygen means absorbing and consuming oxygen from a given environment or reducing the amount of oxygen.

In the present invention, a thermoplastic resin (a) having carbon-carbon double bonds is used. Since the thermoplastic resin (a) has carbon-carbon double bonds within its molecule, the thermoplastic resin (a) reacts with oxygen efficiently, thereby exerting the oxygen scavenging function (i.e., oxygen absorption function). The carbon-carbon double bonds as used herein include conjugated double bonds, but do not include multiple bonds contained in an aromatic ring.

The carbon-carbon double bonds are preferably contained in the thermoplastic resin (a) in an amount of 0.0001 eq/g (equivalents/1 g resin) or more, more preferably 0.0005 eq/g or more, even more preferably 0.001 eq/g or more, most preferably 0.002 eq/g or more. If the content of the carbon-carbon double bonds is less than 0.0001 eq/g, the oxygen absorption rate may not be sufficiently elevated, failing to adequately improve the oxygen scavenging effect of the composition of the present invention.

The molecular weight of the thermoplastic resin (a) is preferably in the range of 1000 to 500000. In consideration of the moldability/processability of the resin compound, the mechanical properties of a molded article produced from the resin compound, and the dispersion of the thermoplastic resin (a) into a thermoplastic resin other than the thermoplastic resin (a), the molecular weight of the thermoplastic resin (a) is more preferably in the range of 10000 to 250000, and most preferably 4000 to 200000.

If the molecular weight of the thermoplastic resin (a) is less than 1000, the moldability/processability and ease of handling of the resin composition may be significantly lowered. The mechanical properties such as strength and elongation of the resultant molded article may also be lowered. In addition, when the thermoplastic resin (a) is mixed with a thermoplastic resin (e.g., a gas barrier resin) other than the thermoplastic resin (a), the dispersion may be lowered, resulting in degrading the gas barrier and oxygen scavenging performances. If the number-average molecular weight exceeds 500000, also, the moldability/processability of the composition may be lowered. The dispersion may also be lowered in the case of a mixture with a thermoplastic resin other than the thermoplastic resin (a), resulting in degrading the gas barrier and oxygen scavenging performance.

The carbon-carbon double bonds of the thermoplastic resin (a) are generally derived from a diene compound although not necessarily limited thereto. Examples of diene compounds used for synthesis of the thermoplastic resin (a) in the present invention include isoprene, butadiene, 2-ethyl butadiene, and 2-butyl butadiene. A single component or two components simultaneously may be used as the diene compound.

The carbon-carbon double bonds of the thermoplastic resin (a) used in the present invention may exist in the main chains or in side chains. Preferably, a larger amount of the double bonds exist in the side chains (i.e., a larger number of groups having carbon-carbon double bonds exist in the side chains) because this facilitates oxygen absorption. For example, in the case of using isoprene or butadiene as the material for synthesis of the thermoplastic resin (a), the vinyl bond content in the resultant thermoplastic resin (a) is preferably 10% or more, more preferably 20% or more, even more preferably 30% or more. The vinyl bond content refers to the proportion of units containing vinyl bond ($CH_2=CH-$) (i.e., units formed by 1,2-addition polymerization of diene compounds) in all diene-derived units in a polymer. Double bonds existing after polymerization may have been partially reduced with hydrogen. This is however acceptable as long as the performance of the composition of the present invention is not impaired.

In order to secure the vinyl bond content of 10% or more, a Lewis base is preferably used as a co-catalyst when the diene compound is polymerized. Examples of the Lewis base include: ethers such as dimethyl ether, diethyl ether, methylethyl ether, and tetrahydrofuran; glycol ethers such as ethylene glycol diethyl ether, and ethylene glycol dimethyl ether; tertiary amines such as N,N,N',N'-tetramethylethylenediamine (TMEDA) and triethylenediamine; and ether-containing amines such as N-methyl morpholine and N-ethyl morpholine. Such a Lewis base is used in an amount of 0.1 to 400 parts by weight with respect to 100 parts by weight of an initiator used in the preparation of the thermoplastic resin (a), the initiator being described later.

As the solvent for the polymerization, an inactive organic solvent is used. Especially suitable are hydrocarbons having 6 to 12 carbon atoms, such as hexane, heptane, octane, decane, and cyclic analogs thereof. Aromatic solvents such as toluene, benzene, and xylene are also suitable. The polymerization is normally carried out at a temperature in the range of –20 to 80° C. for a period of time in the range of 1 to 50 hours.

The thus-prepared thermoplastic resin (a) is easily oxidized since it contains a number of double bonds in the side chains, exhibiting excellent oxygen absorption performance.

Suitable thermoplastic resin (a) include resins of which the number-average molecular weight is in the range of 1000 to 500000, having at least one kind of units represented by formula (I):

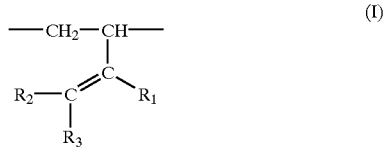

(I)

wherein $R_1$ denotes an alkyl group having 1 to 10 carbon atoms, an aryl group, an alkylaryl group, or an alkoxy group; $R_2$ and $R_3$ denote independently a hydrogen atom, an alkyl group having 1 to 10 carbon atoms, a substituted aryl group or a non-substituted aryl group, $-COOR_4$, $-OCOR_5$, a cyano group, or a halogen atom; and $R_4$ and $R_5$ denote independently an alkyl group having 1 to 10 carbon atoms, an aryl group, an alkylaryl group, or an alkoxy group. The number of carbon atoms of the aryl group is preferably 6 to 10. The number of carbon atoms of the alkylaryl group is preferably 7 to 11. The number of carbon atoms of the alkoxy group is preferably 1 to 10.

Examples of the alkyl group in formula (I) above include a methyl group, an ethyl group, a propyl group, and a butyl group. An example of the aryl group includes a phenyl group. An example of the alkylaryl group includes a benzyl group. Examples of the alkoxy group include a methoxy group and an ethoxy group. An example of the halogen atom includes a chlorine atom.

The thermoplastic resin (a) is easily oxidized when the formula (I) thereof has an alkyl group having 1 to 3 carbon atoms as $R_1$ (especially, when it has a structural unit obtained by polymerizing isoprene, 2-ethylbutadiene, and 2-butylbutadiene), which is therefore suitable as the oxygen absorptive resin. Among these, when the thermoplastic resin (a) has a structural unit represented by formula (I) obtained by polymerizing isoprene (that is, when $R_1$ is a methyl group, and $R_2$ and $R_3$ are hydrogen atoms respectively in formula (I)), the thermoplastic resin (a) is especially easily oxidized because double bonds (vinyl bonds) in the structural unit effectively react with oxygen, providing excellent oxygen absorbency. Isoprene is also suitable in the aspect of the cost for the synthesis of the thermoplastic resin (a) since it is easily available and easily polymerized with other monomers.

The thermoplastic resin (a) used in the present invention is preferably a copolymer of an aromatic vinyl compound and a diene compound. In such a copolymer, double bonds derived from the diene compound easily react with oxygen, thereby improving the oxygen barrier properties and the oxygen scavenging effect. In addition, by adjusting the copolymerization ratio of the aromatic vinyl compound to the diene compound, the moldability/processability of the resultant thermoplastic resin (a) improves and the hardness thereof can be changed. Predetermining the copolymerization ratio of the aromatic vinyl compound to the diene compound also makes it possible to change the refractive index of the resultant thermoplastic resin (a). Therefore, in the case where the composition of the present invention includes a gas barrier resin (b) as will be described later, it is possible to choose the gas barrier resin (b) in which the refractive index is similar to that of the thermoplastic resin (a). The resultant product has excellent transparency. In this way, the composition of the present invention can be adjusted to have properties suitable for various packing materials.

Examples of the aromatic vinyl compound suitable for the synthesis of the thermoplastic resin (a) used in the present invention include styrene, 1-vinylnaphthalene, 2-vinylnaphthalene, 3-vinylnaphthalene, 3-methylstyrene, 4-propylstyrene, 4-cyclohexylstyrene, 4-dodecylstyrene, 2-ethyl-4-benzylstyrene, and 4-(phenylbutyl)styrene. Among these, styrene is most suitable in consideration of the cost and the ease of polymerization.

When the thermoplastic resin (a) is a copolymer of an aromatic vinyl compound and a diene compound, the copolymer is not specifically defined, but may be a random copolymer, a block copolymer, a graft copolymer, or a composite thereof. A block copolymer is preferable in consideration to the production properties, and the mechanical properties, the ease of handling, and the oxygen absorption rate of the thermoplastic resin (a).

When the thermoplastic resin (a) is a block copolymer, the preparation method is not specifically defined, but preferably anion polymerization is employed. When this polymerization process is employed, the number-average molecular weight of the aromatic vinyl compound block is preferably in the range of 300 to 100000, more preferably 1000 to 50000, even more preferably 3000 to 50000. If the molecular weight of the aromatic vinyl compound block is less than 300, the melt viscosity of the thermoplastic resin (a) is low, which may lower the moldability/processability and handling of the resultant resin composition. The resultant molded article tends to be inadequate in its mechanical properties such as strength and elongation. In the case where the thermoplastic resin (a) is dispersed into another resin such as the gas barrier resin (b) as will be described later, the dispersion is restricted, which may degrade the oxygen scavenging performance. If the molecular weight of the aromatic vinyl compound block exceeds 100000, the melt viscosity of the thermoplastic resin (a) is high, impairing the thermoplasticity. This lowers the moldability/processability of the resultant resin composition. The dispersion also lowers as described above, which tends to degrade the oxygen scavenging performance.

The block form of the block copolymer is represented by $A(BA)_n$, $(AB)_n$, wherein A denotes the block composed of an aromatic vinyl compound, B denotes the block composed of a diene compound, and n denotes an integer equal to or more than 1.

The thermoplastic resin (a) used in the present invention is preferably a binary block copolymer or a ternary block copolymer. A ternary block copolymer is more preferable. In view of cost and ease of polymerization, it is preferred that the aromatic vinyl compound block is a polystyrene block and the diene compound block is a polyisoprene block. Especially, the thermoplastic resin (a) is preferably a binary block copolymer composed of a polyisoprene block including a block shown by formula (I) and a polystyrene block, in consideration of the ease of polymerization in the production process, the ease of handling, the oxygen absorption rate, and the cost. More preferably, the thermoplastic resin (a) is a ternary block copolymer composed of a polystyrene block—a polyisoprene block including a block shown by formula (I)—a polystyrene block, in consideration of the improved mechanical properties in addition to the ease of polymerization in the production process, the ease of handling, the oxygen absorption rate, and the cost.

In the thermoplastic resin (a) in the present invention, the tan δ primary dispersion peak temperature of the diene compound derived block is preferably in the range of −40 to 60° C. If it is less than −40° C., the oxygen absorption rate tends to be low, reducing the oxygen scavenging performance. If it exceeds 60 ° C., the oxygen absorption rate at low temperature tends to be reduced, lowering the oxygen scavenging performance. In consideration of the oxygen scavenging performance, the tan δ primary dispersion peak temperature of the diene compound derived block is more preferably in the range of −20 to 40° C., even more preferably −10 to 30° C.

The block copolymer of an aromatic vinyl compound and a diene compound is obtained by various methods. Typical examples of such methods include, but are not limited to, a method in which an aromatic vinyl compound and a diene compound are polymerized using an alkyllithium compound as an initiator and coupled with a coupling agent, and a method in which a diene compound and an aromatic vinyl compound are sequentially polymerized using a dilithium compound as an initiator. Examples of the alkyllithium compound include alkyl compounds of which the alkyl residue has 1 to 10 carbon atoms. Especially preferred are methyllithium, ethyllithium, benzyllithium, and butyllithium.

As the coupling agent, dichloromethane, dibromomethane, dichloroethane, dibromoethane, and the like are used. Examples of the dilithium compound include naphthalenedilithium, oligostyldilithium, and dilithiohexylbenzene. Such an initiator and coupling agent are used in amounts of 0.01 to 0.2 parts by weight and 0.04 to 0.8 parts by weight, respectively, with respect to 100 parts by weight of all monomers used for the polymerization.

A reaction mixture of the polymerization is added to a poor solvent such as methanol, a sediment formed is obtained, and dried by heating or dried under reduced pressure, to obtain a block copolymer. Alternatively, the reaction mixture is added dropwise into boiling water and, after removing a solvent by azeotropy, dried by heating or dried under reduced pressure, to obtain a block copolymer.

The thermoplastic resin (a) may be composed of a single resin or a mixture of a plurality of resins. When the thermoplastic resin (a) is a mixture of resins, in order to obtain a molded article with good transparency, a 20 μm thick film, for example, preferably has an internal haze value of 10% or less.

The thermoplastic resin (a) is susceptible to oxidation due to its structural nature. To prevent the thermoplastic resin (a) from being oxidized during storage, for example, addition of an antioxidant beforehand is recommended.

Examples of the antioxidant include 2,5-di-t-butylhydroquinone, 2,6-di-t-butyl-p-cresol, 4,4'-thiobis(6-t-butylphenol), 2,2'-methylene-bis(4-methyl-6-t-butylphenol), octadecyl-3-(3',5'-di-t-butyl-4'-hydroxyphenyl)propionate, 4,4'-thiobis(6-t-butylphenol), 2-tert-butyl-6-(3-tert-butyl-2-hydroxy-5-methylbenzyl)-4-methylphenylacrylate, pentaerythritoltetrakis(3-laurylthiopropionate), 2,6-di-(t-butyl)-4-methylphenol (BHT), 2,2'-methylenebis(6-t-butyl-p-cresol), triphenyl phosphite, tris-(nonylphenyl) phosphite, and dilauryl thiodipropionate.

An optimal amount of the antioxidant to be added is determined considering the kinds and proportions of components of the composition, the use, the storage conditions, and the like. In general, if a large amount of antioxidant is added, reaction of the thermoplastic resin (a) with oxygen that is transmitted in the resin composition including the thermoplastic resin (a) is blocked. This may prevent the compound of the present invention from satisfactorily exerting its oxygen barrier properties and oxygen scavenging function. On the contrary, if no antioxidant or an excessively small amount of antioxidant is contained, the thermoplastic resin (a) reacts with oxygen during storage or melt processing, resulting in that the oxygen absorption performance has been lowered when it is actually put to use.

In the case where the thermoplastic resin (a) is stored under an inactive gas atmosphere, or the resin composition is prepared by melt blending at a comparatively low temperature or in a nitrogen-sealed state, a small amount of antioxidant may be used.

In the case where an oxidation catalyst composed of a transition metal salt (c) is added during melt blending for facilitating oxidation, the resultant resin composition has good oxygen absorption performance even if the thermoplastic resin (a) contains a certain amount of antioxidant. The content of the antioxidant in such a case is preferably in the range of 0.01 to 1% by weight, more preferably 0.02 to 0.5% by weight. The antioxidant may be added to the thermoplastic resin (a) beforehand as described above, or may be added when components of the oxygen absorptive resin composition are blended, together with other additives as will be described later.

The gas barrier resin (b) included in the oxygen absorptive resin composition of the present invention preferably has a oxygen transmission rate of 500 ml·20 μm/m²·day·atm or less as measured at a temperature of 20° C. and a relative humidity of 65%. This value indicates that the oxygen transmission rate is 500 ml/m²·day·atm or less when the gas barrier resin (b) is a film having a thickness of 20 μm. If the oxygen transmission rate exceeds 500 ml·20 μm/m²·day·atm, the gas barrier performance is not sufficient. The oxygen transmission rate of the gas barrier resin (b) is preferably lower to obtain good gas barrier performance. It is preferably 100 ml·20 μm/m²·day·atm or less, more preferably 20 ml·20 μm/m²·day·atm or less, even more preferably 5 ml·20 μm/m²·day·atm or less.

By blending such a gas barrier resin (b) with the thermoplastic resin (a) having carbon-carbon double bonds, the oxygen absorption effect of the resin (a) is added to the gas barrier effect of the resin (b), resulting in a resin composition having exceptionally high gas barrier properties.

The refractive index of the gas barrier resin (b) used in the present invention is preferably in the range of 1.50 to 1.56. If it fails to be within this range, the difference in the refractive index between the thermoplastic resin (a) and the gas barrier resin (b) is large, lowering the transparency of the resultant resin or resin composition. In general, the refractive index of the thermoplastic resin (a) having carbon-carbon double bonds tends to fall within the above range. It is therefore easy to reduce the difference in the refractive index between the resins (a) and (b), allowing for preparation of a resin composition having good transparency. The refractive index of the gas barrier resin (b) is more preferably 1.51 or more, even more preferably 1.52 or more in the above-mentioned range. It is also more preferably 1.55 or less, even more preferably 1.54 or less in the above-mentioned range.

The kind of the gas barrier resin (b) is not specifically defined. Examples of such a gas barrier resin (b) that satisfies the conditions of the oxygen transmission rate of 500 ml·20 $\mu$m/m$^2$·day·atm or less and the refractive index in the range of 1.50 to 1.56 include, but are not limited to, EVOH, polyamides, polyvinyl chloride, and polyacrylonitrile.

Examples of the gas barrier resin (b) used in the present invention include polyvinyl alcohol resins (b1), polyamides (b2), polyvinyl chloride (b3), and polyacrylonitrile (b4).

The polyvinyl alcohol resin (b1) is obtained by saponifying a vinyl ester homopolymer or a copolymer of vinyl ester and another monomer (especially, a copolymer of vinyl ester and ethylene) using an alkaline catalyst or the like.

As the vinyl ester, a typical compound is vinyl acetate. Other fatty vinyl esters (e.g., vinyl propionate and vinyl pivalate) can also be used.

The degree of saponification of the vinyl ester component of the polyvinyl alcohol resin is preferably 90% or more, more preferably 95% or more, even more preferably 97% or more. If the degree of saponification is less than 90%, the gas barrier properties under high humidity may be lowered. Further, when an ethylene-vinyl alcohol copolymer (EVOH) is used, the thermal stability lowers, and the resultant molded article tends to have gelled aggregates and fisheyes.

When the polyvinyl alcohol resin is a blend of at least two kinds of polyvinyl alcohol resins having different degrees of saponification, the average calculated is based on the blend weight ratio and is determined as the degree of saponification of the blend. The degree of saponification of the polyvinyl alcohol resin can be measured by nuclear magnetic resonance (NMR).

Among the polyvinyl alcohol resins (b1) as the gas barrier resin used in the present invention, EVOH is preferable in consideration of its adaptability to melt molding and good gas barrier properties under high humidity.

The ethylene content of EVOH is preferably in the range of 5 to 60 mol %. If the ethylene content is less than 5 mol %, the gas barrier properties under high humidity lower and the melt moldability may occasionally worsen. The ethylene content of EVOH is preferably 10 mol % or more, more preferably 15 mol % or more, most preferably 20 mol % or more. If the ethylene content exceeds 60 mol %, sufficiently good gas barrier properties may not be easily obtained. The ethylene content is preferably 55 mol % or less, more preferably 50 mol % or less. The ethylene content of EVOH can be measured by NMR.

A suitably used EVOH has an ethylene content in the range of 5 to 60 mol % and a degree of saponification of 90% or more.

When EVOH is a blend of at least two kinds of EVOH having different ethylene contents or degrees of saponification, the average calculated based on the blend weight ratio is determined as the ethylene content or the degree of saponification of the blend.

In the case of the blend of two kinds of EVOH, it is preferable that the difference in the ethylene content between the two kinds of EVOH is 15 mol % or less and that the difference in the degree of saponification is 10% or less. If these conditions fail to be satisfied, the transparency of the resultant resin composition layer is inadequate. In order to obtain good transparency, the difference in the ethylene content is preferably 10 mol % or less, more preferably 5 mol % or less, and the difference in the degree of saponification is preferably 7% or less, more preferably 5% or less.

A small amount of another monomer may be contained in the polyvinyl alcohol resin (b1), especially in EVOH, as a copolymer component within the range not interfering with the purposes of the present invention. Examples of the monomer that may be a copolymer component include: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitrites, amides, and anhydrides thereof; vinylsilane compounds such as vinyltrimethoxysilane; unsaturated sulfonic acids and their salts; alkylthiols; and vinylpyrrolidones.

Among the above, when a vinylsilane compound is contained in EVOH as a copolymer component in an amount of 0.0002 to 0.2 mol %, the consistency of the melt viscosity with the basic resin during coextrusion molding or coinjection molding is improved, allowing for production of a uniformly molded article. Examples of the vinylsilane compound include vinyltrimethoxysilane, vinyltriethoxysilane, vinyltri(β-methoxy-ethoxy)silane, γ-methacryloxypropyltrimethoxysilane. Among these, vinyltrimethoxysilane and vinyltriethoxysilane are preferable.

EVOH containing a boron compound is also effective in improving the melt viscosity of EVOH allowing for production of a uniform coextrusion or coinjection molded article. Examples of the boron compound include boric acids, boric acid esters, borates, and boron hydrides. Specifically, the boric acids include boric acid, orthoboric acid, metaboric acid, and tetraboic acid. The boric acid esters include triethyl borate and trimethyl borate. The borates include alkali metal salts, alkaline-earth metal salts of the boric acids, borax, and the like. Among these compounds, boric acid, orthoboric acid, and NaBH$_4$ are preferable.

The content of the boron compound, if contained, is preferably in the range of 20 to 2000 ppm, desirably 50 to 1000 ppm, in terms of the boron element. With the addition of boron within this range, torque variation in EVOH during melting by heating is suppressed. If the boron content is less than 20 ppm, this effect is minimal. If it exceeds 2000 ppm, gelation tends to occur resulting in poor moldability.

It is also effective in improving the sandwiched layer adhesion and compatibility to add an alkali metal salt to EVOH in an amount of 5 to 5000 ppm in terms of the alkali metal element.

The added amount of the alkali metal salt is more preferably in the range of 20 to 1000 ppm, even more preferably 30 to 500 ppm, in terms of the alkali metal element. Alkali metal in the alkali metal salt includes lithium, sodium, potassium, and the like. Examples of the alkali metal salt include aliphatic carboxylates, aromatic carboxylates, phosphates, and metal complexes of monovalent metals. Specifically, they include sodium acetate, potassium acetate, sodium phosphate, lithium phosphate, sodium stearate, potassium stearate, sodium salt of ethylenediaminetetraacetic acid, and the like. Among these, sodium acetate, potassium acetate, and sodium phosphate are most preferable.

It is also preferable to add a phosphorus compound to EVOH in an amount of 2 to 200 ppm, more preferably 3 to 150 ppm, most preferably 5 to 100 ppm, in terms of the phosphorous element. If the concentration of phosphorus in EVOH is less than 2 ppm or exceeds 200 ppm, the melt moldability and thermal stability of the resultant composition may be lowered. In particular, problems such as generation of gelled aggregates and coloring during long-duration melt molding tend to occur.

The kind of the phosphorus compound added to EVOH is not specifically defined, but various kinds of acids such as phosphoric acid and phosphorous acid and salts thereof may be used. Phosphates may be in the form of primary phosphates, secondary phosphates, or tertiary phosphates. The cationic species of the phosphates is not specifically defined, but the phosphates are preferably alkali metal salts and alkaline-earth metal salts. Among these, it is preferable to add the phosphorus compound in the form of sodium dihydrogenphosphate, potassium dihydrogenphosphate, disodium hydrogenphosphate, or dipotassium hydrogenphosphate.

It is also possible to add to EVOH beforehand a thermal stabilizer, an ultraviolet absorber, an antioxidant, a coloring agent, a filler, and other resins (e.g., polyamides and polyolefins) as required. EVOHs containing a boron compound, an alkali metal salt, a phosphorus compound, and the like are commercially available.

The melt flow rate (MFR) of EVOH used in the present invention (210° C., 2160 g load; according to JIS K7210) is in the range of 0.1 to 100 g/10 min, more preferably 0.5 to 50 g/10 min, and even more preferably 1 to 30 g/10 min.

The kind of the polyamide resin (b2) as the gas barrier resin (b) is not specifically defined. Examples of the polyamide resin (b2) include: aliphatic polyamides which are homopolymers such as polycaproamide (Nylon-6), polyundecanamide (Nylon-11), polylaurolactam (Nylon-12), polyhexamethyleneadipamide (Nylon-6,6), and polyhexamethylenesebacamide (Nylon-6,12); aliphatic polyamides which are copolymers such as a caprolactam/laurolactam copolymer (Nylon-6/12), a caprolactam/aminoundecanoic acid copolymer (Nylon-6/11), a caprolactam/ω-aminononanoic acid copolymer (Nylon-6/9), a caprolactam/hexamethylene adipamide copolymer (Nylon-6/6,6), and a caprolactam/hexamethylene adipamide/hexamethylene sebacamide copolymer (Nylon-6/6, 6/6, 12); and aromatic polyamides such as polymetaxylylene adipamide (MX-Nylon), and a hexamethylene terephthalamide/hexamethylene isophthalamide copolymer (Nylon-6T/6I). These polyamide resins can be used independently or in combinations of two kinds or more.

Among the above polyamide resins, polycaproamide (Nylon-6) and polyhexamethyleneadipamide (Nylon-6,6) are preferable.

Examples of the polyvinyl chloride resin (b3) used in the present invention include homopolymers of vinyl chloride or vinylidene chloride, as well as copolymers thereof with vinyl acetate, a maleic acid derivative, a higher alkyl vinyl ether, and the like.

Examples of the polyacrylonitrile resin (b4) used in the present invention include homopolymers of acrylonitrile, as well as copolymers thereof with acrylic acid ester and the like.

It is possible to add to the gas barrier resin (b) beforehand a thermal stabilizer, an ultraviolet absorber, an antioxidant, a coloring agent, a filler, a plasticizer, and other resins (e.g., polyolefin) as required within the range not interfering with the objectives of the present invention.

The resin composition of the present invention preferably includes the transition metal salt (c). The transition metal salt (c) is preferably included in an amount of 1 to 10000 ppm, more preferably 5 to 5000 ppm, most preferably 10 to 2000 ppm, in terms of the metal element. By the existence of the transition metal salt (c), the oxidation of the thermoplastic resin (a) is facilitated. For example, the thermoplastic resin (a) reacts more effectively with oxygen existing inside a packaging material made of the composition of the present invention and oxygen that is transmitted in the packaging material. As a result, the oxygen barrier properties and the oxygen scavenging function of the resin composition of the present invention improve. If the content of the transition metal salt (c) exceeds 10000 ppm in terms of the metal element, the thermal stability of the resin composition lowers, exhibiting significant generation of a decomposed gas as well as gelled aggregates. In view of this, the content of the transition metal salt (c) is preferably in the range defined above. In the case where the composition of the present invention includes a thermoplastic resin other than the thermoplastic resin (a), the transition metal salt (c) is preferably included in an amount of 1 to 5000 ppm, more preferably 5 to 1000 ppm, even more preferably 10 to 500 ppm.

The metal for such a transition metal salt (c) is preferably selected from the first, second, and third transition elements of the periodic table. Examples of suitable metals include, but are not limited to, manganese, iron, cobalt, nickel, copper, rhodium, titanium, chromium, vanadium, and ruthenium. Among these metals, iron, nickel, copper, manganese, and cobalt are preferable, with manganese and cobalt being more preferable, and cobalt being even more preferable.

Examples of counter ions of the metal for the transition metal salt (c) include, but are not limited to anions derived from organic acids and chlorides. The organic acids include: acetic acid, stearic acid, dimethyldithiocarbamic acid, palmitic acid, 2-ethylhexanoic acid, neodecanoic acid, linoleic acid, tollic acid, oleic acid, resin acid, capric acid, and naphthenic acid. Especially preferred salts are cobalt 2-ethylhexanate, cobalt neodecanoate, and cobalt stearate. The metal salt may be a so-called ionomer having a polymeric counter ion.

The composition of the present invention may include a thermoplastic resin (d) other than the thermoplastic resin (a) and the gas barrier resin (b) within the range not interfering with the effects of the present invention. Examples of the thermoplastic resin (d) include, but are not limited to: ethylene homopolymers and ethylene copolymers (copolymers of ethylene with monomers including: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitriles, amides, and anhydrides thereof; vinyl carboxylates such as vinyl formate, vinyl acetate, vinyl propionate, vinyl butylate, vinyl octanoate, vinyldodecanoate, vinyl stearate, and vinyl arachidonate; vinylsilane compounds such as vinyltrimethoxysilane; unsaturated sulfonic acids and salts thereof; alkylthiols; and vinyl pyrrolidones); propylene homopolymers and propylene copolymers (copolymers of propylene with monomers including: α-olefins such as ethylene, 1-butene, isobutene, 4-methyl-1-pentene, 1-hexene, and 1-octene; unsaturated carboxylic acids such as itaconic acid, methacrylic acid, acrylic acid, and maleic anhydride, and salts, partial or complete esters, nitriles, amides, and anhydrides thereof; vinylcarboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and salts thereof; alkylthiols; and vinylpyrrolidones); polyolefins such as poly-4-methylpentene-1 and polybutene-1; polyesters such as polyethylene terephthalate, polybutylene terephthalate, and polyethylene naphthalate; and polystyrene, polycarbonate, and polyacrylate. The thermoplastic resin (d) is selected depending on the structure and use of the molded article to be produced. Selection factors for this choice are known for respective structures and uses of the molded articles.

In the preparation of the composition including the thermoplastic resin (a), the gas barrier resin (b), and/or the thermoplastic resin (d), the miscibility among the resins (a) and (b) and/or (d) are preferably taken into account. Such miscibility may affect the transparency, clarity, effectiveness as an oxygen scavenger, barrier properties, mechanical properties, texture of the product, and the like.

An oxygen absorptive resin composition of the first embodiment of the present invention includes the thermoplastic resin (a), the gas barrier resin (b), and the transition metal salt (c).

An oxygen absorptive resin composition of the second embodiment of the present invention includes the thermoplastic resin (a) and the gas barrier resin (b), and is characterized in that the oxygen absorption rate is 0.01 ml/m$^2$·day or more.

An oxygen absorptive resin composition of the third embodiment of the present invention includes the thermoplastic resin (a) and the transition salt (c).

The fourth embodiment of the present invention is an oxygen absorptive thermoplastic resin that includes a structural unit represented by formula (I) above, contains carbon-carbon double bonds in formula (I) at a predetermined proportion, and has an oxygen absorption rate of 0.01 ml/m$^2$·day or more.

The contents of the components of the above compositions are not specifically defined. However, when it is intended to obtain compositions having excellent gas barrier properties as in the first and second embodiments, in general, the oxygen absorptive resin composition of the present invention preferably includes the thermoplastic resin (a) in an amount of 1 to 30% by weight and the gas barrier resin (b) in an amount of 99.9 to 70% by weight. The transition metal salt (c) is added, if added, in an amount of 1 to 10000 ppm, preferably 1 to 5000 ppm.

If the content of the gas barrier resin (b) is less than 70% by weight, a molded article such as a multilayered container made of the resin composition may be poor in transparency and gas barrier properties against oxygen or carbon dioxide. If the content of the gas barrier resin (b) exceeds 99.9% by weight, the content of the thermoplastic resin (a) is so small that the oxygen absorption rate tends to decrease lowering the gas barrier properties and the oxygen scavenging performance. The content of the thermoplastic resin (a) in the resin composition is more preferably in the range of 1 to 20% by weight, even more preferably 2 to 15% by weight.

The content of the gas barrier resin (b) is more preferably in the range of 80 to 99% by weight, even more preferably 85 to 98% by weight.

When importance is placed on the oxygen absorption rate, rather than the gas barrier properties, as in the third and fourth embodiment of the present invention, the gas barrier resin (b) may not be contained.

In the resin compositions of the present invention that contain a certain resin other than the thermoplastic resin (a), such as the gas barrier resin (b), it is recommended that particles of the thermoplastic resin (a) are dispersed in a matrix made of the certain resin (e.g., the gas barrier resin (b) and/or the thermoplastic resin (d)) with various additives to be described later added thereto as required. For example, when the oxygen absorptive resin composition of the present invention is essentially composed of the thermoplastic resin (a) and the gas barrier resin (b), it is recommended that particles of the thermoplastic resin (a) are dispersed in a matrix of the gas barrier resin (b). Resultant molded articles made of the composition of this form can maintain the oxygen scavenging performance and the gas barrier properties. This form is thus preferable in that the function of the resin other than the thermoplastic resin (a), such as the gas barrier resin (b), is exhibited. This also exhibits good transparency. The size of the dispersed particles of the thermoplastic resin (a) is preferably 10 μm or less. If the particle size exceeds 10 μm, the area of the interfaces between the thermoplastic resin (a) and the resin other than the thermoplastic resin (a) decreases, which may lower the oxygen gas barrier properties as well as the oxygen scavenging performance. In consideration of the oxygen scavenging performance, gas barrier properties, and transparency of the resultant molded articles such as a multilayered container made of the resin composition, the mean size of dispersed particles of the thermoplastic resin (a) is more preferably 5 μg m or less, even more preferably 2 μm or less.

In the composition of the present invention that contains a thermoplastic resin other than the thermoplastic resin (a), such as the gas barrier resin (b), the resultant molded article made of the composition has good transparency when the difference in the refractive index between the thermoplastic resin (a) and the resin other than the thermoplastic resin (a) is 0.01 or less. If the difference in refractive index exceeds 0.01, the resultant molded article tends to be somewhat less transparent. In order to obtain good transparency, the difference in refractive index is preferably 0.007 or less, more preferably 0.005 or less. Examples of the gas barrier resin (b) having a refractive index that is different from that of the thermoplastic resin (a) by 0.01 or less include, but are not limited to, vinyl alcohol resins such as polyvinyl alcohol and poly(ethylene vinyl alcohol), polyamides, polyvinyl chloride, and polyacrylonitrile.

The resin composition of the present invention contains various additives as required. Examples of such additives include an antioxidant, a plasticizer, a thermal stabilizer (melt stabilizer), a photoinitiator, a deodorant, an ultraviolet absorber, an antistatic agent, a lubricant, a coloring agent, a filler, a desiccant, a pigment, a dye, a processing aid, a flame retardant, a defogging agent, and other polymer compounds. These additives can be added within the range not interfering with the functions and effects of the present invention.

As the thermal stabilizer (melt stabilizer), for example, one kind or at least two kinds selected from hydrotalcite compounds and metal salts of higher aliphatic carboxylic acids (e.g., calcium stearate and magnesium stearate) are used. Such compounds are preferably added in an amount of 0.01 to 1% by weight of the entire resin composition.

The hydrotalcite compounds, when included in the resin composition of the present invention, provide an effect of preventing gelled aggregates and fisheyes from generating with time in a layer of the resin composition, thereby further improving the long-term operational stability.

The metal salts of higher aliphatic carboxylic acids, when included in the resin composition of the present invention, provide an effect of preventing gelled aggregates and fisheyes from generating with time, thereby further improving the long-term operational stability.

The metal salts of higher aliphatic carboxylic acids mean metal salts of higher fatty acids having 8 to 22 carbon atoms. Examples of higher fatty acids having 8 to 22 carbon atoms include lauric acid, stearic acid, and myristic acid. Examples of the metals of the metal salts include sodium, potassium, magnesium, calcium, zinc, barium, and aluminum. Among these, alkaline-earth metals such as magnesium, calcium, and barium are preferred.

The photoinitiator is used for initiating or facilitating oxygen scavenging in a layered structure, a packaging film, and the like made of the resin composition.

When the oxygen absorption composition contains an antioxidant, the composition is recommended to also contain one kind or at least two kinds of photoinitiators. By irradiating the composition containing a photoinitiator with light at a specfied time, the initiation of reaction of the thermoplastic resin (a) with oxygen is facilitated, activating the oxygen scavenging function of the composition.

Examples of a suitable photoinitiator include, but are not limited to benzophenone, o-methoxybenzophenone, acetophenone, o-methoxyacetophenone, acenaphthenequinone, methyl ethyl ketone, valerophenone, hexanophenone, α-phenyl butyrophenone, p-morpholinopropiophenone, dibenzosuberone, 4-morpholinobenzophenone, benzoin, benzoin methylether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthone, 3-acetylphenanthrene, 3-acetylindole, 9-fluorenone, 1-indanone, 1,3,5-triacetylbenzene, thioxanthen-9-one, xanthen-9-one, 7-H-benz[de]anthracen-7-one, benzoin tetrahydropyranyl ether, 4,4'-bis(dimethylamino)benzophenone, 1'-acetonaphthone, 2'-acetonaphthone, acetonaphthone and 2,3-butanedione, benz[a]anthracene-7,12-dione, 2,2-dimethoxy-2-phenylacetophenone, α, α-diethoxyacetophenone, α, α-dibuthoxyacetophenone. A singlet oxygen generation photosensitizer, e.g., rose bengal, methylene blue, and tetraphenyl porphyrin, can also be used as the photoinitiator. In addition to the monomer photoinitiators as described above, polymer photoinitiators can also be used, including poly-(ethylene carbon monoxide) and oligo-[2-hydroxy-2-methyl-1-[4-(1-methylvinyl)-phenyl]-propanone]. In general, a photoinitiator is preferable because it provides swifter and more efficient initiation of reaction.

The photoinitiator, when contained in the resin composition of the present invention, facilitates the initiation of reaction of the thermoplastic resin (a) with oxygen upon exposure to radiation. The amount of the photoinitiator used varies depending on various factors, and is generally determined appropriately depending on the kind of the thermoplastic resin (a) used, the wavelength and intensity of radiation used, the nature and amount of the antioxidant used, and the type of the photoinitiator used. The amount of the photoinitiator also varies depending on the form of the oxygen absorptive resin composition when it is used. For example, when a somewhat opaque layered molded article made of the composition containing a photoinitiator is to be irradiated with radiation, a comparatively large amount of photoinitiator is required.

In general, the amount of the photoinitiator, if contained, may be in the range of 0.01 to 10% by weight of the entire composition.

The oxygen absorptive composition of the present invention containing such a photoinitiator is exposed to radiation at a specifed time, whereby oxygen scavenging of the composition is initiated. The exposure to radiation shortens or eliminates the induction period for oxygen trapping by the oxygen absorptive composition to a significant extent to facilitate the initiation or proceeding of the oxygen trapping. The induction period refers to the period required for the oxygen absorptive composition to fully initiate the oxygen trapping.

As the radiation used in connection with the photoinitiator, chemical radiation, such as ultraviolet or visible light having a wavelength of about 200 to 750 nm, preferably about 200 to 400 nm, is useful. Chemical radiation, which has a comparatively long wavelength, is preferable in consideration to the cost and the influence on human health. Preferably, the oxygen absorptive composition is exposed to at least 0.1 joule of radiation per 1 g of the thermoplastic resin (a) contained in the composition. A typical exposure amount is in the range of 10 to 100 joule per 1 g of the thermoplastic resin (a). Electron beams of doses of about 0.2 to 20 megarads, preferably about 1 to 10 megarads, may also be used as the radiation. As other radiation sources, ionized radiation such as gamma rays, X-rays, and corona discharge is used. The exposure to radiation is preferably carried out in the presence of oxygen. The duration of exposure varies depending on various factors, including, but not limited to, the amount and type of the contained photoinitiator, the shape of the molded article to be exposed (e.g., the thickness of the layered structure), the total amount of antioxidants contained, and the wavelength and intensity of the radiation source.

The exposure to radiation of the oxygen absorptive resin composition of the present invention containing the photoinitiator may be carried out after the composition has been formed into a desired molded product or article, or during the formation. For example, in the case where the composition of the present invention is used for packaging of an oxygen-sensitive product, exposure of the composition may be immediately before, during, or after the packaging. It should be noted that the exposure to radiation needs to be carried out before the molded product or article is used as the oxygen trapping agent. In order to secure maximum uniform irradiation, the exposure should be carried out at a stage where the molded product or article is still in the form of a flat sheet, for example.

The deodorant (or a reodorant or an adsorbent; hereinafter, these agents are generically called the deodorant) is used to reduce odor generated by a low-molecular by-product produced during the oxygen scavenging of the resin composition of the present invention.

Examples of an appropriate deodorant include, but not confined to, zinc compounds, aluminum compounds, silicon compounds, ferrous compounds, organic acids, and ferrous compound-organic acid compositions. These can be used individually or as a mixture or can be a double salt.

Examples of the zinc compounds include zinc silicate, zinc oxide, zinc sulfate, zinc chloride, zinc phosphate, zinc nitrate, zinc carbonate, zinc acetate, zinc oxalate, zinc citrate, zinc fumarate, and zinc formate.

Examples of the aluminum compounds include aluminum sulfate, aluminum phosphate, aluminum silicate, and potassium aluminum sulfate.

Examples of the silicon compounds include silicon dioxide, silicon phosphates such as silicon orthophosphate, silicon pyrophosphate type I, and silicon pyrophosphate type II, and activated silica gel.

As the ferrous compounds, any ferrous compounds that form bivalent iron ions may be used. Examples include: ferrous inorganic salts such as ferrous sulfate, ferrous chloride, ferrous nitrate, ferrous bromide, and ferrous iodide; and ferrous organic salts such as ferrous gallate, ferrous malate, and ferrous fumarate. Among these, ferrous sulfate and ferrous chloride are preferable.

A composition (mixture or double salt) containing a zinc compound and a silicon compound is also suitably used. A preferred substantive example of such a composition is zinc silicate in the form of substantially indeterminate microparticles, which is mostly of an amorphous structure and essentially composed of zinc oxide and silicon dioxide at a weight ratio in the range of 1:5 to 5:1. The ratio of zinc oxide to silicon dioxide is preferably in the range of 1:4 to 4:1, more preferably 1:3 to 3:1.

Also suitably used is a composition of a zinc compound and an aluminum compound. A preferred concrete example of such a composition is a mixture of zinc oxide and/or zinc carbonate and aluminum sulfate and/or potassium aluminum sulfate, in the proportion of 1 to 1000 parts by weight, preferably 30 to 300 parts by weight of the aluminum compound with respect to 100 parts by weight of the zinc compound.

Preferred examples of the organic acids include organic acids having at least eight carbon atoms, such as aliphatic monocarboxylic acids, aliphatic polycaroxylic acids, aromatic monocarboxylic acids, and aromatic polycarboxylic acids. Especially preferred are aromatic carboxylic acids. Examples of the aromatic polycarboxylic acid include phthalic acid, terephthalic acid, isophthalic acid, trimellitic acid, 1,2,3-benzenetricarboxylic acid, 1,3,5-benzenetricarboxylic acid, pyromellitic acid, benzenehexacarboxylic acid, naphthalenedicarboxylic acid, naphthalenetricarboxylic acid, naphthalenetetracarboxylic acid, diphenyltetracarboxylic acid, diphenylethertetracarboxylic acid, azobenzenetetracarboxylic acid, and anhydrides thereof. Among these acids, benzenetricarboxylic acids, especially trimellitic acid, are preferred.

As the ferrous compound in the ferrous compound-organic acid compositions, any ferrous compounds that dissolve in water to form bivalent iron ions may be used as described above. Examples of such ferrous compounds include: ferrous inorganic salts such as ferrous sulfate, ferrous chloride, ferrous nitrate, ferrous bromide, and ferrous iodide; and ferrous organic salts such as ferrous gallate, ferrous malate, and ferrous fumarate. Among these, ferrous sulfate and ferrous chloride are preferable.

As the organic acids of the ferrous compound-organic acid compositions, those soluble in water may be used. Examples of such organic acids include: ascorbic acids such as ascorbic acid, isoascorbic acid, and metal salts thereof; and carboxylic acids such as citric acid, isocitric acid, lactic acid, tartaric acid, and malic acid. Among these, L-ascorbic acid is preferred.

The ferrous compound and the organic acid constituting the composition optimally bond with each other. Such a composition can be prepared by, for example, mixing and dissolving the two components in water, drying the resultant solution by spraying or freezing, and powdering the dried product. The weight ratio of the ferrous compound to the organic acid is preferably in the range of 1:0.01 to 1:1.0, more preferably 1:0.02 to 1:0.80. When the organic acid is an ascorbic acid, the weight ratio of the ferrous compound to the organic acid is preferably in the range of 1:0.02 to 1:0.30, more preferably 1:0.02 to 1:0.13, even more preferably 1:0.05 to 1:0.13. A combination of two or more kinds of ferrous compounds or a combination of two or more kinds of organic acids may be used. Alum may preferably be added as a stabilizer of the deodorizing function to the ferrous compound-organic acid composition in an amount of 2 to 20% by weight of the total amount of the ferrous compound and the organic acid. Preferred examples of the alum include, but not limited to, potash alum, ammonia alum, and sodium alum.

Examples of other useful deodorants include: metal compositions having a stabilized metal compound such as a composition of a zinc compound and polycarboxylic acid; bioenzyme model compounds such as a ferrous-phthalocyanine derivative; plant saps such as paulownia, holly tree, devilwood, Japanese silverleaf, butterbur, lilac, Chinese golden bell, chestnut, and alder and extracts thereof; aluminosilicates such as zeolite; water-containing magnesium silicate clay minerals such as sepiolite, silotile, barigorskite, and raphrynite; and activated humic acid, activated alumina, and activated carbon. Porous adsorbents can also be used.

Among the above exemplified deodorants, especially preferred are: zinc compounds such as zinc oxide and zinc sulfate; silicon compounds such as silicon dioxide and silicon orthophosphoric acid; aluminum compounds such as aluminum sulfate and potassium aluminum sulfate; compositions containing a zinc compound and a silicon compound; compositions containing a zinc compound and an aluminum compound; organic acids; and ferrous compound-organic acid compositions.

Among the above deodorants, those preferably usable for the resin or resin composition of the present invention are compositions of zinc silicate or zinc oxide with an alum.

When the resin or resin composition of the present invention is formed into a multilayered structure, the deodorant can be contained in various manners. The deodorant may be contained in the layer of the resin or resin composition of the present invention or in a layer other than the above layer as will be described later. When the multilayered structure of the present invention includes an adhesive resin layer between the resin composition layer and a layer of another thermoplastic resin, the adhesive resin layer may contain the deodorant. The deodorant may be contained in one of these layers, or two or more layers as required. The content of the deodorant is 0.1% by weight or more, preferably 0.2 to 50% by weight, more preferably 0.5 to 10% by weight, of the total weight of the layer that contains the deodorant (e.g., the resin layer).

The oxygen absorptive resin composition of the present invention has various excellent properties. For example, the second embodiment of the oxygen absorptive resin composition of the present invention has an oxygen absorption rate of 0.01 ml/m$^2$·day or more as described above. In the first and third embodiments of the present invention, also, the oxygen absorption rate is preferably 0.01 ml/m$^2$·day or more. The oxygen absorption rate is more preferably 0.05 ml/m$^2$·day or more, even more preferably 0.1 ml/m$^2$·day or more. If the oxygen absorption rate is less than 0.01 ml/m$^2$·day, the oxygen barrier properties of a molded article such as a multilayered container produced from the resin composition of the present invention, as well as the oxygen scavenging effect thereof, tend to be insufficient.

The oxygen absorption rate as used herein refers to the volume of oxygen absorbed by a unit area of a film of the resin composition during a unit period of time for which the film is left to stand in an atmosphere of a given volume of air. A reliable measurement method will be described in the Examples.

When the resin or resin composition of the present invention is used as an oxygen scavenger, the useful scavenging rate (oxygen absorption rate) is expressed as follows: That is, an area of 1 m² of the film of the thermoplastic resin (a) having carbon-carbon double bonds absorbs preferably 0.5 ml of oxygen, more preferably 5 ml or more of oxygen, per day in the air under 1 atmospheric pressure at 20° C. In this case, the third and fourth embodiments are preferable.

The oxygen scavenging amount of the resin or resin composition of the present invention is preferably 1 ml or more per gram, more preferably 10 ml or more per gram, even more preferably 50 ml per gram.

The melt flow rate (MFR) of the oxygen absorptive resin or resin composition of the present invention is 0.1 to 100 g/10 min, more preferably 0.5 to 50 g/10 min, and even more preferably 1 to 30 g/10 min (210° C., 2160 g load; according to JIS K7210). If MFR fails to be within the range of 0.1 to 100 g/10 min, the processability during melt molding tends to degrade.

The oxygen absorptive resin or resin composition of the present invention is molded into various types of molded articles depending on the use thereof.

The method for mixing components of the oxygen absorptive resin composition and molding the composition, as well as the order of the mixing, are not specifically defined. For example, when the thermoplastic resin (a), the gas barrier resin (b), and the transition metal salt (c) are blended to produce a molded article, they may be mixed simultaneously. Alternatively, the thermoplastic resin (a) and the transition metal salt (c) may be first blended and the resultant blend may be mixed with the gas barrier resin (b). The gas barrier resin (b) and the transition metal salt (c) may be first blended and the resultant blend may be mixed with the thermoplastic resin (a). The thermoplastic resin (a) and the gas barrier resin (b) may be first blended and the resultant blend may be mixed with the transition metal salt (c). Otherwise, the thermoplastic resin (a) and the gas barrier resin (b), and the gas barrier resin (b) and the transition metal salt (c) may be blended individually, and the resultant blends may be mixed.

The components of the composition may be melt-blended into pellets before being molded, or may be dry-blended to be directly molded.

The above components may be blended and kneaded by, for example, a method in which the resin components are dissolved with a solvent and mixed, and then the solvent is evaporated, or a method in which the components are melted and kneaded at a temperature in the range of 50 to 300° C. (melt blending method). The method is not specifically defined, but the melt blending method is preferable in consideration of the simplified process and the cost. Melt blending is carried out using a ribbon blender, a high-speed mixer, a Ko-kneader, a mixing roll, an extruder, a Banbury mixer, an intensive mixer, and the like.

For example, the components of the composition of the present invention is kneaded with a Banbury mixer, a uniaxial or biaxial screw extruder, or the like to be pelletized for melt molding. In order to hinder the progress of oxidation of the thermoplastic resin (a) during blending, it is preferable to seal a hopper inlet with nitrogen gas and extrude the resin at a low temperature. Also preferable is to use an extruder with high kneading ability to allow the components to be finely and uniformly dispersed. By this, good oxygen absorption performance and good transparency are obtained, and generation and mixing of gelled aggregates and fisheyes are prevented.

Kneading is important to ensure good dispersion of the components in the resin composition. As the kneader for realizing high-level dispersion of the components, continuous kneaders such as a continuous intensive mixer and a kneading type biaxial extruder (unidirectional or bi-directional) are optimal. Batch kneaders such as a Banbury mixer, an intensive mixer, and a pressure kneader may also be used. As another continuous kneader, a device using a rotary disk having an trituration mechanism such as a stone mill, for example, KCK Kneading Extruder from KCK Co., Ltd., may be used. Those commonly used as a kneader also include a uniaxial extruder provided with a kneading section (e.g., Dulmage and CTM) and a simple kneader such as a Brabender mixer.

Among the above, the continuous intensive mixer is most preferable for the purpose of the present invention, which is available as FCM from Farrel Corp., CIM from The Japan Steel Works, Ltd., and KCM, LCM, and ACM from Kobe Steel, Ltd. In practice, a device equipped with a uniaxial extruder underneath such a kneader is preferably used for achieving kneading and extrusion palletizing simultaneously. Also used for the kneading according to the present invention is a biaxial kneading extruder equipped with a kneading disk or a kneading rotor, such as TEX from The Japan Steel Works, Ltd., ZSK from Werner & Pfleiderer Corp., TEM from Toshiba Machine Co., Ltd., and PCM from Ikegai Tekko Co, Ltd.

In the use of the above continuous kneaders, the shape of the rotor or disk plays a key role. In particular, the gap between the mixing chamber and the rotor chip or the disk chip (chip clearance) is important: Being too narrow or too wide fails to provide a composition with good dispersion. The optimal chip clearance is in the range of 1 to 5 mm.

The rotational speed of the rotor of the kneader lies in the range of 100 to 1200 rpm, desirably 150 to 1000 rpm, more desirably 200 to 800 rpm. The inner diameter (D) of the chamber of the kneader is, for example, 30 mm or more, desirably in the range of 50 to 400 mm. The ratio (L/D) of the length (L) to the diameter (D) of the kneader is preferably in the range of 4 to 30. A single kneader may be used, or two or more kneaders may be used by coupling.

A longer kneading period provides better results. However, considering the prevention of oxidation of the thermoplastic resin (a) and the cost, the kneading time may be in the range of 10 to 600 seconds, preferably 15 to 200 seconds, most preferably 15 to 150 seconds.

By appropriately employing a molding method among various possibilities described above, the resin composition of the present invention can be molded into a variety of molded articles such as films, sheets, containers, other packaging materials, and deoxidizers of various shapes.

For example, the resin composition can be molded into films, sheets, pipes, and the like by melt extrusion molding, into containers by injection molding, and into bottle-like hollow containers by blow molding. Preferred embodiments of the blow molding include, but not limited to, extrusion blow molding where a parison is formed by extrusion molding and blown to obtain a molding, and injection blow molding where a preform is formed by injection molding and blown to obtain a molding.

In addition to the application to a variety of packaging materials and containers as described above, the oxygen absorptive resin composition of the present invention is also useful as a deoxidizer due to its excellence in oxygen absorbency, ease of handling, and processability. The deoxidizer is produced by molding the oxygen absorptive resin or resin composition of the present invention into an arbitrary shape. By placing the deoxidizer in a container filled with food, medicine, or the like, oxygen inside the container can be effectively scavenged. If direct contact is not preferable between the resin composition of the present invention and the content, the molded article made of the resin composition of the present invention may be placed in a package that blocks permeation of the contents but allows gas to be transmitted therethrough. For example, in a preferred embodiment, the molded article made of the resin composition of the present invention may be filled into a package made of nonwoven fabric or the like if the content is a solid having a sufficiently large mean particle size.

The shape of the deoxidizer is not specifically defined, but the deoxidizer is preferably in the shape of a film or particles in order to increase the surface area per unit volume thereof and thereby to efficiently exert the oxygen scavenging function.

In general, in a preferred embodiment, the thus-obtained various types of molded articles may be coated with a thermoplastic resin other than the resin or resin composition of the present invention. In the case of a container for receiving matter inside, for example, such a coating serves not only to minimize direct contact of the matter with the oxygen absorptive resin composition, but also controls the rate at which oxygen enters from outside by selecting the kind and thickness of the coating thermoplastic resin so as to adjust the rate at which the resin composition of the present invention reacts with oxygen. By thus adjusting the oxygen absorption rate of the resin composition of the present invention, the oxygen scavenging function of the resin composition can be maintained for a prolonged period of time.

The method for coating the molded article made of the resin composition of the present invention with another thermoplastic resin or the like is not specifically defined. Preferred embodiments of such a method are: depositing a thermoplastic resin or the like on at least one surface of the layer made of the resin composition of the present invention to form a multilayered structure; and forming multilayered polymer particles having a core made of the resin composition of the present invention and an outermost layer made of another thermoplastic resin.

According to the present invention, the molded article, such as a film and a sheet, produced by any of the above molding methods may be composed of a single layer. In view of the capability of providing a number of functions, however, the molded article is more preferably a laminate with a layer or layers made of other various resins, metal, paper, woven fabrics, or nonwoven fabrics. If the resin composition of the present invention is used as a single-layer structure, the area thereof coming into contact with oxygen is large, whereby the duration of the oxygen scavenging function may be shortened. In addition, the mechanical strength may be lowered after oxygen scavenging, and the gas barrier properties may be lowered due to the moisture exuding from the content or the external atmosphere. To avoid such troubles, a layer of the gas barrier resin (b) or a layer having high mechanical strength may be formed on the layer of the resin composition of the present invention.

Thus, according to the present invention, a multilayered structure is preferable from the viewpoints that the inward oxygen transmission rate can be suppressed and that the oxygen scavenging function of the resin composition can be maintained for a prolonged period of time. The present invention therefore includes a multilayered structure or a multilayered container having a layer including the oxygen absorptive resin composition or the oxygen absorptive resin.

In a preferred embodiment, a multilayered container has an innermost layer made of the resin composition of the present invention. This allows the resin composition to swiftly exert the oxygen scavenging function within the container.

Concrete examples of the multilayered structure include structures of A/B, A/B/A, A/C/B, A/C/B/C/A, A/B/A/B/A, and A/C/B/C/A/C/B/C/A wherein A denotes a layer made of a resin other than the thermoplastic resin (a), metal, paper, woven fabric, or nonwoven fabric, B denotes a layer made of the thermoplastic resin (a) or a resin composition including the thermoplastic resin (a), and C denotes an adhesive resin layer. The structure is not limited to these examples, but any additional layer or layers may be appropriately provided. In the case of the structure including a plurality of layers made of a resin other than the thermoplastic resin (a), such layers may be made of the same kind of resin or different kinds of resin. A recovered resin layer made of scraps generated by trimming during molding may be separately formed, or such recovered resin may be blended in a layer made of another resin. The thickness relationship of the multilayered structure is not specifically defined. However, in consideration of the moldability and the cost, the thickness of the entire B layer(s) is preferably 2 to 20% of the total thickness.

A thermoplastic resin is preferably used as the material for the resin layer to be formed on the molded article made of the oxygen absorptive resin composition of the present invention in consideration of the processability and the like. Examples of such a thermoplastic resin include, but are not limited to: ethylene homopolymers and ethylene copolymers (copolymers of ethylene with monomers including: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride and salts, partial or complete esters, nitriles, amides, and anhydrides thereof; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and salts thereof; alkylthiols; and vinylpyrrolidones); propylene homopolymers and propylene copolymers (copolymers of propylene with monomers including: α-olefins such as ethylene, 1-butene, isobutene, 4-methyl-1-pentene, 1-hexene, and 1-octene; unsaturated carboxylic acids such as itaconic acid, methacrylic acid, acrylic acid, and maleic anhydride and salts, partial or complete esters, nitriles, amides, and anhydrides thereof; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and salts thereof; alkylthiols; and vinylpyrrolidones); polyolefins such as poly-4-methylpentene-1 and polybutene-1; polyesters such as polyethylene terephthalate, polybutylene terephthalate, and polyethylene naphthalate; polyamides such as poly ε-caprolactam, polyhexamethylene adipamide, and polymetaxylylene adipamide; and polyvinylidene chloride, polyvinyl chloride, polystyrene, polyacrylonitrile, polycarbonates, and polyacrylate. The layer made of such a thermoplastic resin may not be subjected to drawing, or subjected to uniaxial or biaxial drawing or rolling.

Among the above thermoplastic resins, polyolefin is preferable in consideration of its excellence in moisture-resistance, mechanical properties, economy, heat sealing, and the like. Polyester has good transparency and mechanical properties, and thus will be useful if it is laminated with the resin composition of the present invention that also has good transparency.

As the material for the metal layer that can be laminated with the resin composition of the present invention, steel and aluminum generally used for cans may be used.

An adhesive resin may be used for adhesion of the layer of the resin composition of the present invention with another resin layer. The adhesive resin is not specifically defined as long as it can bond the layers. However, preferably used are polyurethane or polyester one-component or two-component curing adhesives, and carboxylic acid modified polyolefins. The carboxylic acid modified plolyolefins are polyolefin copolymers containing unsaturated carboxylic acids or anhydrides thereof (e.g., maleic anhydride) as copolymer components or graft polymers obtained by grafting unsaturated carboxylic acids or anhydrides thereof to polyolefins Among the above, the carboxylic acid modified polyolefin resin is more preferable in consideration of the adhesion of the surface layer made of polyolefin and the like with the resin composition layer. Examples of the carboxylic acid modified resin include a resin which is obtained by carboxylic acid modification of polyethylene (low-density polyethylene (LDPE), linear low-density polyethylene (LLDPE), very low-density polyethylene (VLDPE)), polypropylene, copolymerized polypropylene, ethylene-vinyl acetate copolymers, and ethylene-(meth)acrylic acid ester (methyl ester or ethyl ester) copolymers.

When the molded article of the present invention is a multilayered product, the oxygen scavenging layer may optionally be laminated with a layer made of an "oxygen barrier material" and the like, that is, a layer made of a material having an oxygen transmission rate of 200 cm$^3$/m$^2$·day or less at 20° C. under 1 atmospheric pressure. Typical examples of the oxygen barrier material include poly(ethylene-vinyl alcohol), polyacrylonitrile, polyvinyl chloride, poly(vinylidene dichloride), polyethylene terephthalate, silica, and polyamides. A copolymer including one kind of the above monomers, as well as a metal foil layer, may also be used.

The additional layer(s) of the multilayered structure may include one or more kinds of oxygen transmission layer(s). One example of a flexible packaging film especially for foods is a laminate packaging film including (i) an oxygen blocking layer, (ii) a layer including the oxygen absorptive resin composition of the present invention, and optionally (iii) an oxygen transmission layer. This film is used for packaging with the layer (i) being on the outer side and the layer (iii) being on the inner side. With this arrangement, the oxygen blocking layer (i) controls inward transmission of oxygen toward the layer (ii) thereby extending the time usable for the oxygen scavenging in the layer (ii). The oxygen transmission layer (iii) adjusts the oxygen transmission rate therein, thereby extending the time usable for the oxygen scavenging in the layer (ii). This serves to extend the life of the oxygen scavenging substance during the handling of the film before packaging. The layer (iii) also serves to block movement of the thermoplastic resin (a), the transition metal salt (c), additives, and by-products produced by oxygen scavenging toward the inside of the package. Further, the layer (iii) serves to enhance the heat sealing, the transparency, and/or the resistance against sticking of the multilayered film.

Examples of the method for producing the multilayered structure include, but not limited to, extrusion lamination, dry lamination, solvent casting, coinjection molding, and coextrusion molding. The coextrusion molding includes coextrusion lamination, coextrusion sheet molding, coextrusion inflation process, and coextrusion blow molding.

The sheet, film, parison, and the like of a multilayered structure produced by any of the above methods may further be reheated at a temperature below the melting point of the contained resin and subjected to thermoforming such as stretch forming, rolling, pantographic drawing, tubular film drawing, or blow molding to stretch the film and the like uniaxially or biaxially, so as to obtain stretched molded products.

The transparency of the resin composition of the present invention improves by appropriately selecting the thermoplastic resin (a), the gas barrier resin (b) and the like constituting the resin composition in consideration of the respective refractive indexes. Therefore, by selecting a resin with good transparency for a layer to be laminated, a container allowing its content to be clearly visible is obtained. If a multilayered structure with good transparency is desired, the internal haze should preferably be 10% or less, more preferably 5% or less, even more preferably 3% or less.

The oxygen absorptive resin or resin composition of the present invention can be used as the oxygen absorbent of an arbitrary shape. Also, molded articles such as containers, especially multilayered structures, using the resin or resin composition have various applications. The excellence of the resin composition of the present invention in the oxygen scavenging performance and gas barrier properties is greatly exhibited when the resin composition is used for various types of packages. In particular, the resin composition is suitably used for packages for materials that are susceptible to degradation in the presence of oxygen, such as foods, medicines, and agricultural chemicals. Further, the resin composition of the present invention is suitably used for gaskets for containers, especially as gaskets for container caps. Caps equipped with such gaskets have good barrier properties and oxygen scavenging properties.

The resin composition of the present invention is also suitable for a package that allows its content to be clearly visible because good transparency can be obtained by appropriately selecting the resins as described above. The following two embodiments of packages have a strict requirement for transparency and thus particularly receive a benefit from the resin composition of the present invention.

One of the packages is a container made of a multilayered film having a total thickness of 300 μm or less, including a layer made of the oxygen absorptive resin or resin composition of the present invention. The other package is a multilayered container including a layer made of the oxygen absorptive resin or resin composition of the present invention and a thermoplastic polyester layer. These containers will be described below.

The container having a total thickness of 300 μm or less including a layer made of the resin composition of the present invention is a flexible container composed of a comparatively thin multilayered structure, which is normally processed into a form of a pouch or the like.

In general, a container that requires good transparency is made thin as a whole. The respective resin layers constituting the multilayered structure of the container are thin. For example, in the case of using a crystalline resin such as polyolefin, if the thickness is large, the transparency tends to be worsened due to scattering in the crystal, while if the thickness is small, good transparency is obtained. Also, in general, while a non-oriented crystallized resin exhibits poor transparency, an oriented crystallized resin exhibits good transparency. Such a uniaxial or biaxial oriented film is normally thin. Also from this point, a thin multilayered structure tends to exhibit good transparency.

Thus, the resin composition of the present invention exhibits very good transparency by selecting appropriate resins, and therefore can be suitably used for containers that are composed of a thin multilayered film and in many cases requires good transparency. Such a thin film retains comparatively good transparency even when the transparency degrades over time.

The thickness of the multilayered film is not specifically defined, but is preferably 300 μm or less, more preferably 250 μm or less, even more preferably 200 μm, to retain good transparency. The lower limit of the thickness is not specifically defined, either, but is preferably 10 μm or more, more preferably 20 μm or more, even more preferably 30 μm or more, in consideration of the mechanical strength as the container.

The method for forming such a multilayered film is not specifically defined, but the multilayered film can be formed by laminating the layer of the resin composition of the present invention with another thermoplastic resin layer by techniques such as dry lamination and coextrusion lamination.

In the case of dry lamination, non-oriented films, uniaxial oriented films, biaxial oriented films, and rolled films can be used. Among these, a biaxial oriented polypropylene film, a biaxial oriented polyethylene terephthalate film, and a biaxial oriented poly ∊-caprolactam film are suitable considering strength, transparency, and the like. The biaxial oriented polypropylene film is especially suitable since it has good moisture-resistance.

At least one outer surface of the multilayered film constituting a package is preferably covered with a layer made of a heat-sealable resin to seal the package. Polyolefins such as polyethylene and polypropylene may be used as such a heat-sealable resin.

The laminated film may further be re-heated and subjected to thermoforming such as stretch forming, rolling, pantographic drawing, or tubular film drawing to stretch the film uniaxially or biaxially, so as to obtain oriented multilayered film.

The thus-obtained multilayered film can be processed into a bag shape to be filled with a material as a package. Such a package is flexible and convenient, and has good transparency, gas barrier properties, and oxygen scavenging performance, so that it is significantly useful as a package for foods especially.

The multilayered container including the layer of the resin composition of the present invention and the thermoplastic polyester layer is given good transparency by selecting appropriate resins, and has good gas barrier properties and oxygen scavenging performance.

Polyester resin generally has good transparency. Therefore, a multilayered structure with good transparency is obtained by laminating a polyester resin with the resin composition of the present invention.

The form of the multilayered container including the layer of the resin composition of the present invention and the thermoplastic polyester layer is not specifically defined, but may be a bag-shaped container, a cup-shaped container, or a hollow molded container. The hollow molded container is important over all others, which is produced by a method including, but not limited to, blow molding and injection molding. In practice, blow molding is important, and especially a bottle-shaped container formed by blow molding is important.

Blow-molded bottles made of a thermoplastic polyester resin are now broadly used as containers for drinks. For this use, such bottles are required to satisfy the conditions that the contents, i.e., a drink, be prevented from degrading and that it be clearly visible by the consumer. Moreover, when oxygen-sensitive drinks such as beer that easily degrades in flavor are to be packaged, the bottles are required to have considerably high gas barrier properties and oxygen scavenging performance. It is not easy to satisfy these requirements.

The blow-molded multilayered bottle made of the layer of the resin composition of the present invention and the thermoplastic polyester layer is an optimal package for the above use with its advantages of keeping the quality of the content from degrading while retaining the transparency.

As the polyester resin used for the multilayered container of the present invention including the layer made of the oxygen absorptive resin or resin composition and the layer of the thermoplastic polyester resin, condensation polymers including aromatic dicarboxylic acids or alkyl esters thereof and diols as main components are used. In particular, polyester resins including ethylene terephthalate as a main component are preferable to attain the purpose of the present invention. In general, the polyester resin used in the present invention includes a terephthalic acid unit and an ethylene glycol unit so that the total proportion (mol %) of these units is preferably 70 mol % or more, more preferably 90 mol % or more, of the total moles of all the structural units of the polyester. If the total proportion is less than 70 mol %, the resultant polyester is amorphous, whereby the polyester resin greatly contracts when it is hot-filled in a container for drawing, resulting in poor thermal resistance and strength. Moreover, the softened resin tends to stick during solid-phase polymerization carried out to reduce oligomers contained in the resin, whereby the preparation is made with difficulty.

The above polyester resin may contain a bifunctional compound unit other than the terephthalic acid unit and the ethylene glycol unit as required within the range not greatly interfering with the processability, strength, thermal resistance, and the like of the resin. The proportion (mol %) of such a bifunctional compound unit is preferably 30 mol % or less, more preferably 20 mol % or less, even more preferably 10 mol % or less, of the total moles of all the structural units of the polyester.

A preferred bifunctional compound unit allowed to be contained in the resin is at least one selected from a dicarboxylic acid unit, a diol unit, and a hydroxycarboxylic acid unit. Such bifunctional compound units may be either aliphatic, alicyclic, or aromatic bifunctional compound units.

In view of processability and transparency, the thermoplastic polyester may preferably include an ethylene terephthalate component as a main component and have a melting point of 240 to 250° C.

If the melting point exceeds 250° C., the crystallization rate of the polyester resin is high, and thus the crystallization of the heated and melted polyester is facilitated during injection molding and blow molding. The resulting bottles are likely to generate whitening and may be poor in transparency. The degree of orientation by drawing may also be lowered, and an intended shape of molded bottles may not be obtained. This narrows the range of conditions under which good products can be produced, which tends to increase the defective production rate of products. The melting point is more preferably 248° C. or less.

If the melting point is less than 240° C., the thermal resistance of the multilayered container lowers. The crystallinity of the polyester resin also lowers below the required level, thereby lowering the degree of orientation by drawing and the mechanical strength of the polyester resin. In addition, due to the decrease in the melting point, the solid-phase polymerization temperature must be lowered. This lowers the reaction rate and thus disadvantageously lowers the productivity of the resin. The melting point is more preferably 242° C. or more, most preferably 244° C. or more.

In order to obtain the polyester resin having a melting point within the above range, the polyester resin including an ethylene terephthalate component as a main component should further contain an appropriate amount of a copolymerized component. Specifically, the polyester resin preferably contains a copolymerized component in an amount of 1 to 6 mol %, more preferably 1.5 to 5 mol %, most preferably 2 to 4 mol %, of the total mole amount of all the structural units of the polyester.

The polyester resin having the copolymerized component within the above range can be obtained by the addition of comonomer to the preparation system of polyethylene terephthalate considering the amount of diethylene glycol produced as a by-product during the preparation and the amount of the comonomer to be included in the resin. Such a comonomer is not specifically defined, but the monomers mentioned above as the bifunctional units may be used. Among those, neopentyl glycol, cyclohexanedimethanol, cyclohexanedicarboxylic acid, isophthalic acid, naphthalenedicarboxylic acid are preferable.

Among the above monomers, isophthalic acid is advantageous since the resultant copolymerized polyester provides a broad range of conditions under which good products can be produced. This results in good processability and thus a lowered defective production rate. This monomer is also advantageous in that the molded article is prevented from whitening caused by a suppressed crystallization rate.

Also preferable are a 1,4-cyclohexanedimethanol unit and 1,4-cyclohexanedicarboxylic acid in that the resultant molded article has good impact strength against dropping.

Naphthalene dicarboxylic acid is also preferable in that the resultant polyester has a high glass transition temperature and thus the container as the final product has an improved thermal resistance. Further, the polyester containing naphthalenedicarboxylic acid as the copolymer component can absorb ultraviolet radiation. This is especially useful when the content is susceptible to degradation by ultraviolet radiation. For example, this is useful when the content is, for example, beer that is susceptible to degradation by both oxidation and ultraviolet radiation.

When the container produced by coinjection stretch blow molding is used for protecting the contents from ultraviolet radiation, the thermoplastic polyester resin preferably contains a 2,6-naphthalenedicarboxylic acid component in an amount of 0.5 to 15 mol %, more preferably 1.0 to 10 mol %, with respect to the entire dicarboxylic acid component.

In the case of using a polycondensation catalyst during the preparation of the polyester resin, a catalyst normally used in such an occasion may be used. Examples of such a catalyst include: antimony compounds such as antimony trioxide; germanium compounds such as germanium dioxide, germanium tetraethoxide, and germanium tetra n-buthoxide; titanium compounds such as titanium methoxide, titanium ethoxide, titanium n-propoxide, titanium isopropoxide, and titanium butoxide; and tin compounds such as di-n-butyltin dilaurate, di-n-butyltin oxide, and dibutyltin diacetate. These catalyst compounds may be used individually or in combination of two or more. Among these polycondensation catalysts, germanium compounds are preferable in that the resultant polyester has a good color tone, while antimony compounds are preferable in view of the cost of the catalyst. Among the germanium compounds, germanium dioxide is especially preferable. Among the antimony compounds, antimony trioxide is especially preferable. The polycondensation catalyst is preferably added in an amount of 0.02 to 0.8 parts by weight with respect to 100 parts by weight of dicarboxylic acid.

In the light of moldability, the germanium compounds are more preferably used than the antimony compounds. More precisely, in general, the crystallization rate of the polyester obtained by polymerization using an antimony compound is greater than the case using a germanium compound. This means that in the case of using an antimony compound, crystallization tends to proceed easily by heating during injection molding or blow molding. The resultant bottles are likely to generate whitening and may be poor in transparency. The degree of orientation by drawing may also be lowered, and an intended shape of molded bottles may not be obtained. This narrows the range of conditions under which good products can be produced, which tends to increase the rate of production of defective products.

In the case where the polyethylene terephthalate used which contains no copolymerized component except for diethylene glycol as a by-product, the crystallization rate is higher compared with the case where the polyethylene terephthalate is slightly modified with another copolymerized component. In the former case, therefore, the selection of the catalyst is especially important. As mentioned above, a germanium compound is preferably used as the catalyst.

The preparation method of the polyester resin used for the thermoplastic polyester layer of the multilayered blow bottle is not specifically defined. The polyester resin can be prepared by a normal method using diol, dicarboxylic acid, the polymerization catalyst, and the like described above.

The production of a bottle container as the multilayered container having the thermoplastic polyester layer will be described.

The method for producing such a container is not specifically defined, but coinjection blow molding is preferred in the light of productivity. In coinjection blow molding, a multilayered container precursor (parison) is formed generally by a molding machine equipped with two injection cylinders. In the molding machine, the single mold is at first clamped, and a molten polyester resin (PES) and a molten oxygen absorptive resin composition of the present invention are injected into the mold from respective injection cylinders alternately at nonsynchronized timings or simultaneously through concentric nozzles, or by a combined manner. The coinjection in that manner gives the intended multilayered parison. Concretely, for example, (1) PES for the inner and outer layers is first injected, and then the resin composition for the sandwiched layer is injected simultaneously with the injection of PES to form the sandwiched layer simultaneously with the formation of the inner and outer layers, giving a three-layered container of PES/resin composition/PES; or (2) PES for the inner and outer layers is first injected, then the resin composition is injected simultaneously with the injection of PES to form a layer simultaneously with the formation of the inner and outer layers, and at the same time or thereafter PES for the core layer is injected simultaneously with the injection of the above PES and the resin composition to form the core layer simultaneously with the formation of the above layers, giving a five-layered container of PES/resin composition/PES/resin composition/PES. Anyhow, any ordinary methods can be employed for producing bottomed parisons in which the resin composition layer is completely sealed with the PES layers. Therefore, the parison production does not require any specialized equipment. An adhesive resin layer may be interposed between the PES layer and the resin composition layer as required.

Regarding the conditions for injection molding to give the bottomed parisons, PES is desirably injected at a temperature in the range of 250 to 330° C., more preferably 270 to 320° C., even more preferably 280 to 310° C. If the injection temperature for PES is lower than 250° C., the PES pellets are not satisfactorily melted, and the resulting molded articles will have non-molten PES pellets (fisheyes), by which their appearance is worsened. In addition, the existing non-molten PES pellets lower the mechanical strength of the molded articles. In some extreme cases, the screw torque for the PES injection will increase whereby the molding machine will have operational malfunctions. If the injection temperature for PES exceeds 330° C., PES will be highly decomposed to have a lowered molecular weight, whereby the mechanical strength of the molded articles will be lowered. In addition, the PES decomposition gives off some vapors of acetaldehyde and the like, by which the properties of the contents to be filled in the molded articles (e.g., bottles) will be worsened. Moreover, the oligomers resulting from the PES decomposition will greatly contaminate the mold, and the resultant molded articles will have a bad appearance.

The oxygen absorptive resin composition is desirably injected at a temperature in the range of 170 to 250° C., more preferably 180 to 240° C., even more preferably 190 to 230° C. If the injection temperature for the resin composition is lower than 170° C., the pellets of the resin composition are not satisfactorily melted, and the resulting molded articles will have non-molten fragments of pellets (fisheyes), by which their appearance is worsened. In some extreme cases, the screw torque for the injection of the resin composition will increase whereby the molding machine will have operational malfunctions. If the injection temperature for the resin composition exceeds 250° C., oxidation of the thermoplastic resin (a) will proceed to lower the oxygen absorption performance of the resin composition, whereby the gas barrier properties and the oxygen scavenging performance tend to be lowered. In addition, the molded articles will be unfavorably colored and contain gelled materials whereby the appearance of the resulting molded articles will be poor. Moreover, the flow of the resin composition being injected will be disordered or blocked by vapors generated through decomposition of the resin composition and by the gelled materials, whereby the layer of the resin composition will have failed areas. In some extreme cases, the gelled materials will make it impossible to continue the injection molding operation. In order to suppress the progress of the oxidation of the thermoplastic resin (a) during melting, the supply hopper may preferably be sealed with nitrogen.

The oxygen absorptive resin composition of the present invention may be first formed into pellets by melt-blending the thermoplastic resin (a), and optionally the gas barrier resin (b), the transition metal salt (c) and the like, and then the pellets may be supplied to the molding machine. Alternatively, the respective materials may be dry-blended, and then the dry blend may be fed to the molding machine.

The temperature of the hot runner parts through which PES and the resin composition run to be injected into the mold is desirably in the range of 220 to 300° C., more preferably 240 to 280 ° C., even more preferably 250 to 270° C.

If the temperature of the hot runner parts is lower than 220° C., PES will crystallize and solidify in the hot runner parts. If so, the molding operation will become difficult. If the temperature of the hot runner parts exceeds 300° C., oxidation of the resin composition will proceed to lower the oxygen absorption performance of the resin composition, whereby the gas barrier properties and the oxygen scavenging performance tend to be lowered. In addition, the molded articles will be unfavorably colored and contain gelled materials whereby the appearance of the resulting molded articles will be poor. Moreover, the flow of the resin composition being injected will be blocked by vapors generated through decomposition of the resin composition and by the gelled materials, whereby the layer of the resin composition will have failed areas. In some extreme cases, the gelled materials will make it impossible to continue the injection molding operation.

In order to ensure good delamination resistance and appearance of the multilayered containers to be obtained from the bottomed parisons through stretch blow molding, it is important that the crystallization of PES and the gas barrier resin (b) is minimized as much as possible in the above injection molding stage. In that condition, the parisons can be uniformly stretched into good molded articles having good delamination resistance, transparency, and shape retentivity. In order to minimize the crystallization of PES and the gas barrier resin (b) in the parisons, the mold temperature desirably falls in the range of 0 to 70° C., more preferably 5 to 50° C., even more preferably 10 to 30 ° C. If the mold temperature is lower than 0° C., the dew formed around the mold will worsen the appearance of the parisons, from which good molded articles will not be obtained. If the mold temperature exceeds 70° C., the crystallization of PES and the gas barrier resin (b) will be promoted. As a result, the parisons fail to be uniformly stretched, and the delamination resistance of the molded articles to be obtained from them through stretch blow molding will be low. In addition, it is difficult to obtain molded articles of the intended shape. Moreover, the PES crystallization lowers the transparency of the molded articles.

The total thickness of the parison is preferably in the range of 2 to 5 mm, and the thickness of the oxygen absorptive resin composition layers is preferably in the range of 10 to 500 $\mu$m in total.

The thus-produced multilayered parison is directly in its high-temperature state, or after having been re-heated to the temperature in the range of 75 to 150° C. with a heating means such as a block heater, an infrared heater, or the like, transferred to the next stretch blowing stage. In the stretch blowing stage, the parison is stretched one- to five-fold in the machine direction, and thereafter blown one- to four-fold with compressed air or the like into a multilayered stretch-blown polyester container with the layers of PES and the oxygen absorptive resin composition being uniaxially or biaxially oriented.

In the above stage, if the temperature at which the multilayered parison is heated is too high, the polyester will easily crystallize whereby the stretch-blown container is whitened and its appearance becomes poor. In addition, the delamination of the stretch-blown container will increase unfavorably. If the temperature at which the multilayered parison is heated is too low, the polyester will be crazed to be pearly whereby the transparency of the resulting container will be lowered. For these reasons, the temperature of the multilayered parison being heated preferably falls in the range of 85 to 140° C., more preferably 90 to 130° C., even more preferably 95 to 120° C.

The total thickness of the body part of the stretch-blown container of the present invention generally falls in the range of 100 to 2000 μm, preferably 150 to 1000 μm, and may vary depending on the use of the container. In that part of the container, the total thickness of the oxygen absorptive resin composition layer is preferably in the range of 2 to 200 μm, more preferably 5 to 100 μm.

Thus, the multilayered containers including the layer of the thermoplastic resin or resin composition of the present invention and the thermoplastic polyester resin layer are obtained. The containers are given good transparency by appropriately preparing the compositions for the containers. The containers also have excellent gas barrier properties and oxygen scavenging performance. The containers are therefore suitable for packaging the materials susceptible to degradation in the presence of oxygen, such as foods and medicines. Especially, they can be used most suitably as containers for drinks such as beer.

EXAMPLES

Hereinbelow, the present invention will be described in more detail by way of examples, which, however, are not intended to restrict the scope of the invention. In the following examples, the samples were analyzed and evaluated in the following manner.

(1) Styrene Content, Content of the Structural Unit Represented by Formula (I) (Vinyl Bond Content), and Content of Carbon-Carbon Double Bonds of Thermoplastic Resin (a):

The thermoplastic resin (a) was subjected to $^1$H-NMR (nuclear magnetic resonance) to obtain NMR spectra with deuterio chloroform as the solvent using JNM-GX-500 Model (from JEOL Ltd.), to identify the structure of the resin and calculate the above contents.

As used herein, the styrene content refers to the amount (mol %) of styrene unit contained in all the monomer units constituting the resin. The content of the structural unit represented by formula (I) (vinyl bond content) refers to the proportion (%) of the structural unit represented by formula (I) (that is, the proportion of units forming vinyl bond) in all the diene monomer units existing in a diene block. The content of carbon-carbon double bonds was obtained by calculating the mole amount (eq/g) of the double bonds contained in 1 g of the resin.

(2) Melt Flow Rate:

This was measured using a melt indexer, L244 (from Takara Industry). Concretely, chips of the sample resin (or resin composition) were filled into a cylinder having an inner diameter of 9.55 mm and a length of 162 mm, and melted therein at 210° C. A load was uniformly applied to the molten sample resin with a plunger having a weight of 2,160 g and a diameter of 9.48 mm, by which the resin was extruded out of the cylinder through a center orifice having a diameter of 2.1 mm. The flow rate (g/10 min) of the resin being extruded, i.e., the melt flow rate, was measured.

(3) Refractive Index of Resin:

The resin to be measured was subjected to extrusion molding to obtain non-oriented films having a thickness of 20 μm. The refractive index of the resultant films was measured using an Abbe refractometer (4T Model from Atago Co., Ltd., SL-Na-1 Lamp from Toshiba Corp.). The temperature of the resin being extruded was 210° C. when the resin was EVOH, 260° C. when the resin was polyamide, 160° C. when the resin was polyvinyl chloride, and 200° C. when the resin was polyacrylonitrile.

(4) Haze Value:

The resin or resin composition to be measured was subjected to extrusion molding to obtain non-oriented films having a thickness of 20 μm. The internal haze value of the resultant films was measured using a Poic integrating-sphere light transmittance/complete light reflectance meter (HR-100 Model from Murakami Color Technology Laboratories) according to ASTM D1003-61. Multilayered films were also subjected to the above measurement. As for multilayered bottles, the body of the bottle was divided into four portions around the circumference at its center. The internal haze values of the respective four portions were measured and averaged to determine the resulting mean value as the haze value of the bottle.

(5) tan δ Primary Dispersion Peak Temperature in Block Derived from Diene Compound of Resin:

The resin or resin composition to be measured was subjected to extrusion molding to obtain non-oriented films having a thickness of 20 μm. The resultant films were used to measure the tan δ primary dispersion peak temperature in a block derived from the diene compound of the resin using DVE RHEOSPECTOLER DVE-V4 (from Rheology Co., Ltd.) under the conditions of a frequency of 11 Hz, a displacement amplitude of 10 μm, an inter-chuck distance of 20 mm, a width of 5 mm, a measurement temperature range of −150 to 150° C., and a temperature rise rate of 3° C./min.

(6) Ethylene Content and Degree of Saponification of Polyvinyl Alcohol Resin (b1):

The ethylene content and the degree of saponification of the polyvinyl alcohol resin (b1) were obtained from $^1$H-NMR (nuclear magnetic resonance) spectra with deuterio dimethyl sulfoxide as the solvent using JNM-GX-500 Model (from JEOL Ltd.).

(7) Contents of Structural Units of Polyester:

The contents of respective structural units of polyester were obtained from $^1$H-NMR (nuclear magnetic resonance) spectra with deuterio trifluoroacetic acid as the solvent using JNM-GX-500 Model (from JEOL Ltd.).

(8) Phosphoric Acid Radical Content of Polyvinyl Alcohol Resin (b1):

The phosphoric acid radical content was measured in terms of the phosphoric acid ions ($PO_4^{3-}$) by the following method. Ten grams of a dry sample of the polyvinyl alcohol resin was put into 50 ml of 0.01N hydrochloric acid, and stirred at 95° C. for six hours. The resulting aqueous solution was quantitatively analyzed through ion chromatography to determine the phosphoric acid ion content. As the column of the chromatography, CIS-A23 (from Yokogawa Electric Corp.) was used. As the eluent, used was an aqueous solution containing 2.5 mM sodium carbonate and 1.0 mM sodium hydrogencarbonate. The quantification was based on the calibration curve of aqueous solutions of phosphoric acid.

(9) Na, K, Mg Ion Contents of Polyvinyl Alcohol Resin (b1):

Ten grams of the sample dry chips were put into 50 ml of 0.01N hydrochloric acid, and stirred at 95° C. for six hours. The resulting aqueous solution was quantitatively analyzed through ion chromatography to determine the Na, K, and Mg ion contents. As the column of the chromatography, ICS-C25 (from Yokogawa Electric Corp.) was used. As the eluent, used was an aqueous solution containing 5.0 mM tartaric acid and 1.0 mM 2,6-pyridinedicarboxylic acid. The quantification was based on the calibration curves of aqueous solutions of sodium chloride, aqueous solutions of potassium chloride, and aqueous solutions of magnesium chloride, respectively. From the thus-obtained Na ion, K ion, and Mg ion contents, derived were the alkali metal salt content and the alkaline-earth metal content of the dry chips in terms of the metal.

(10) Oxygen Absorption Rate (10-1) Oxygen Absorption Rate of Resin Composition (1):

The oxygen absorptive resin composition was subjected to extrusion molding to obtain films having a thickness of 20 μm. A 0.01 m² area of the resultant single-layer film (0.1 m×0.1 m; surface area: 0.02 m²) was precisely taken, rolled one hour after the film formation, and put into a 260 ml glass container filled with air of 20° C. and 65% RH containing oxygen and nitrogen at a volume ratio of 21:79. The opening of the glass container was then sealed with a multilayered sheet including an aluminum layer using an epoxy resin, and left to stand at 20° C. The air inside the container was sampled with a syringe periodically after the sealing, to measure the oxygen concentration of the air by gas chromatography. A small hole formed through the multilayered sheet for sampling was sealed with the epoxy resin every time the hole was formed. The oxygen decrease amount was calculated from the volume ratio of oxygen to nitrogen in the air as measured by gas chromatography, so as to obtain the oxygen absorption amount of the resin composition at each measurement time. From graph representation of the results, the oxygen absorption rate (ml/m²·day) of the resin composition at the time when the highest rate was observed was determined. This calculation method was employed in Example 1.

(10-2) Oxygen Absorption Rate of Resin Composition (2):

The resin composition was subjected to extrusion molding to obtain films having a thickness of 20 μm. A 0.9 m² area of the resultant single-layer film (0.2 m×4.5 m; surface area: 1.8 m²) was rolled five hours after the film formation, and put into a 375 ml Erlenmeyer flask filled with air of 20° C. and 65% RH containing oxygen and nitrogen at a volume ratio of 21:79. The opening of the flask was then sealed with a multilayered sheet including an aluminum layer using an epoxy resin, and left to stand at 20° C. The air inside the container was sampled with a syringe 48 hours, 96 hours, and 192 hours after the sealing to measure the oxygen concentration of the air by gas chromatography. A small hole formed through the multilayered sheet for sampling was sealed with the epoxy resin every time the hole was formed. The oxygen decrease amount (i.e., oxygen absorption amount) was calculated from the volume ratio of oxygen to nitrogen in the air as measured by gas chromatography. The oxygen absorption rate (ml/m²·day) of the resin composition was determined by dividing the oxygen decrease amount for six days from day 2 to day 8 by the number of days and the surface area. This calculation method was employed in Examples 2 to 8 and Comparative Example 1.

(11) Oxygen Transmission Rate of Gas Barrier Resin (b):

The gas barrier resin (b) was subjected to extrusion molding to obtain non-oriented films having a thickness of 20 μm. The resultant films were adjusted in temperature and humidity to 20° C. and 65% RH, to measure the oxygen transmission rate using an oxygen transmission amount measurement device (OX-TRAN-10/50A from Modern Control Corp.). The temperature of the resin being extruded was 210° C. when the resin was EVOH, 260° C. when the resin was polyamide, 160° C. when the resin was polyvinyl chloride, and 200° C. when the resin was polyacrylonitrile.

(12) Limiting Viscosity of Polyester:

A sample film layer was taken out of the polyester layer of the body part of a multilayered container and dissolved in a 1/1 (by weight) mixed solvent of phenol and tetrachloroethane. The viscosity of the resultant solution was measured at 30° C. using an Ubbelohde's viscometer (HRK-3 Model from Hayashi Seisakusho).

(13) Glass Transition Temperature and Melting Point of Polyester:

A sample film layer was taken out of the polyester layer of the body part of a multilayered container, and the measurement was carried out according to JIS K7121 by differential scanning calorimetry (DSC) using a differential scanning calorimeter (DSC) RDC220/SSC5200H Model (from Seiko Electronics Industry). Precisely, the sample was kept at 280° C. for five minutes, cooled to 30° C. at a cooling rate of 100° C./min, kept at the temperature for five minutes, and then heated at a heating rate of 10° C./min. Through the above heat cycle, the glass transition temperature and the melting point were obtained. For temperature calibration, indium and lead were used. The glass transition temperature as referred to herein indicates the midway glass transition temperature (Tmg) according to JIS K7121, and the melting point as referred to herein indicates the melting peak temperature (Tpm) according to the same.

(14) Oxygen Transmission Amount of Multilayered Film (1)

The oxygen transmission amount of a multilayered film was measured in an atmosphere of adjusted temperature and humidity of 20° C. and 85% RH using an oxygen transmission amount measurement device (OX-TRAN-10/50A from Modern Control Corp.). The multilayered film was placed in the device so that the layers of the film be in the order of [oriented polypropylene film layer/urethane adhesive layer/oxygen barrier film layer/urethane adhesive layer/oxygen scavenging film layer/urethane adhesive layer/oriented polypropylene film layer] from the side of the oxygen supply cell toward the nitrogen supply cell. The measurement was carried out periodically over 720 hours starting 24 hours after the film formation. This method was employed in Example 1.

(15) Oxygen Transmission Amount of Multilayered Film (2)

A multilayered film including the resin composition layer and the oriented polypropylene film was used. The oxygen transmission amount of this film was measured in an atmosphere of adjusted temperature and humidity of 20° C. and 85% RH using the oxygen transmission amount measurement device (OX-TRAN-10/50A from Modern Control Corp.). The measurement was carried out periodically over 300 hours starting 24 hours after the film formation. This method was employed in Examples 2 to 8 and Comparative Example 1.

(16) Oxygen Absorption Amount of Multilayered Container

A pouch made of a multilayered film was filled with 300 ml of air of 20° C. and 65% RH containing oxygen and nitrogen at a volume ratio of 21:79. The pouch was sealed and left to stand at 20° C. The air was sampled with a syringe periodically after the sealing, to measure the oxygen concentration of the air by gas chromatography. A small hole formed through a multilayered sheet for sampling was sealed with an epoxy resin every time the hole was formed. The oxygen decrease amount was calculated from the volume ratio of oxygen to nitrogen in the air as measured by gas chromatography, to determine the oxygen absorption rate.

(17) Oxygen Transmission Amount of Multilayered Container

The oxygen transmission amount of a molded bottle itself was measured ten days after the molding by the following process. The bottle was stored for 10 days in an air atmosphere of 20° C. and 65% RH for the outside of the bottle in an air atmosphere of 20° C. and 100% RH for the inside thereof. After the storage, the bottle was measured using the oxygen transmission amount measurement device (OX-TRAN-10/50A from Modern Control Corp.), to obtain the oxygen transmission amount per container (ml/ container·day·atm). Thereafter, the bottle was stored for three months in an air atmosphere of 20° C. and 65% RH for the outside of the bottle and in a nitrogen atmosphere of 20° C. and 100% RH for the inside thereof. After the storage, the bottle was again measured for the oxygen transmission amount per container (ml/container·day·atm).

Example 1

The thermoplastic resin (a) containing an antioxidant was prepared in the following manner.

Into an autoclave equipped with a stirrer cleaned with dry nitrogen, 600 parts by volume of cyclohexane, 0.16 parts by volume of N,N,N',N'-tetramethylethylenediamine (TMEDA), and 0.094 parts by volume of n-BuLi as an initiator were placed. After the temperature was raised to 50° C., 4.25 parts by volume of a styrene monomer were fed to the autoclave to be polymerized for 1.5 hours. After the temperature was lowered to 30° C., 120 parts by volume of isoprene were fed to the autoclave to be polymerized for 2.5 hours. The temperature was raised again to 50° C., and 4.25 parts by volume of the styrene monomer were fed to be polymerized for 1.5 hours.

To the resultant reaction mixture were added 2-tert-butyl-6-(3-tert-butyl-2-hydroxy-5-methylbenzyl)-4-methylphenylacrylate and pentaerythritoltetrakis(3-laurylthiopropionate) as an antioxidant in an amount of 0.15 phr each with respect to the total weight of styrene and isoprene. The resultant reaction mixture was poured into methanol to allow the ternary block copolymer to precipitate. The precipitate was dried to obtain the thermoplastic resin (a) containing an antioxidant.

The thus-obtained ternary block copolymer had a number-average molecular weight of 85000. The molecular weight of each styrene block of the copolymer was 8500 and the styrene content thereof was 14 mol %. As for the isoprene block, the vinyl bond content was 55% and the content of the structural unit represented by formula (I) was 55%. The content 6f carbon-carbon double bonds in the ternary block copolymer was 0.014 eq/g, and the melt flow rate was 7.7 g/10 min. The resin included 0.12% by weight of 2-tert-butyl-6-(3-tert-butyl-2-hydroxy-5-methylbenzyl)-4-methylphenylacrylate and 0.12% by weight of pentaerythritoltetrakis(3-laurylthiopropionate).

The refractive index and haze value of the resultant thermoplastic resin (a) containing an antioxidant were measured, and the results were 1.531 and 1.0%, respectively.

The tan δ primary dispersion peak temperature in a block derived from the diene compound of the resin was measured and found to be −3° C.

A hundred parts by weight of the above thermoplastic resin and 0.8484 parts by weight of cobalt (II) stearate (0.0800 parts by weight in terms of cobalt atoms) were dry-blended, and the blend was extruded using a 30 mm dia. biaxial extruder (TEX-30SS-30CRW-2V from The Japan Steel Works, Ltd.) under the conditions of a screw rotational speed of 300 rpm and an extruded resin amount of 25 kg/hour at 210° C., and pelletized. The pellets were dried under reduced pressure for 16 hours at 30° C., to obtain the oxygen absorptive resin composition. The melt flow rate of the resin composition was 7.1 g/10 min (210° C., 2160 g load).

The above resin composition was subjected to extrusion molding at 210° C., to obtain a film having thickness of 20 μm. The internal haze value of the film was measured and found to be 0.5%. The oxygen absorption amount of the film was measured by the method described under clause (10-1) above. The results are as shown in FIG. 1. From the graph obtained, the oxygen absorption rate of the resin composition was determined to be 95 ml/m$^2$ day.

Figure 2:
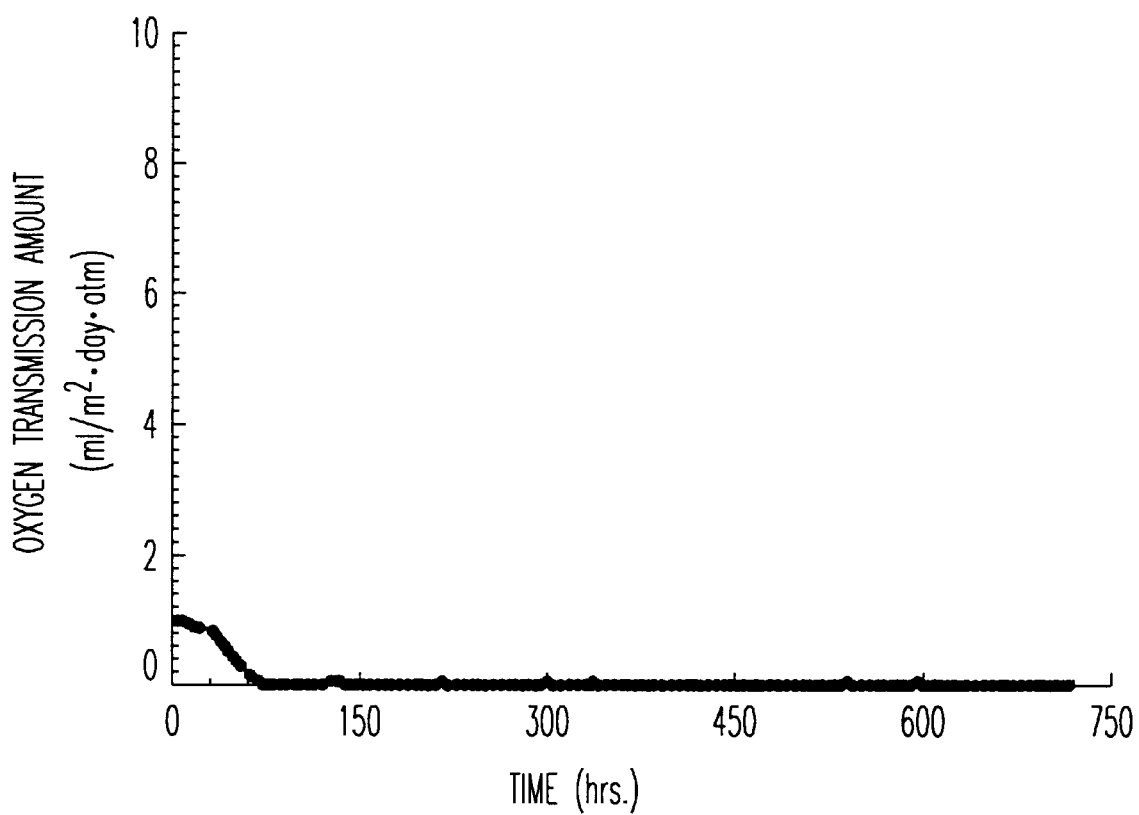
FIG. 2 is a graph plotting the oxygen transmission amount of a multilayered film of Example 1 with respect to time.

A laminate film was produced from the film (oxygen absorptive film) made of the above resin composition in the following manner. An oriented polypropylene film having a thickness of 20 μm (OP-#20 U-1 from Tohcello Co., Ltd.) was laminated with the oxygen absorptive film via a urethane adhesive (a toluene/methyl ethyl ketone mixed solution (weight ratio 1:1) of an adhesive (AD335A from Toyo Morton Ltd.) and a curing agent (Cat-10 from Toyo Morton Ltd.)). On the other surface of the oxygen absorptive film were laminated an oxygen barrier film having a thickness of 15 μm (EVAL film EF-F#15 from Kuraray Co., Ltd.) and an oriented polypropylene film having a thickness of 20 μm (OP-#20 U-1 from Tohcello Co., Ltd.) in this order via the same urethane adhesive. In this way, a multilayered film having a structure of oriented polypropylene film layer/urethane adhesive layer/oxygen barrier film layer/urethane adhesive layer/oxygen absorptive film layer/urethane adhesive layer/oriented polypropylene film layer was obtained. The haze of this multilayered film was 2.7%. The oxygen transmission amount of the multilayered film was measured periodically, and the results shown in FIG. 2 were obtained.

Figure 3:
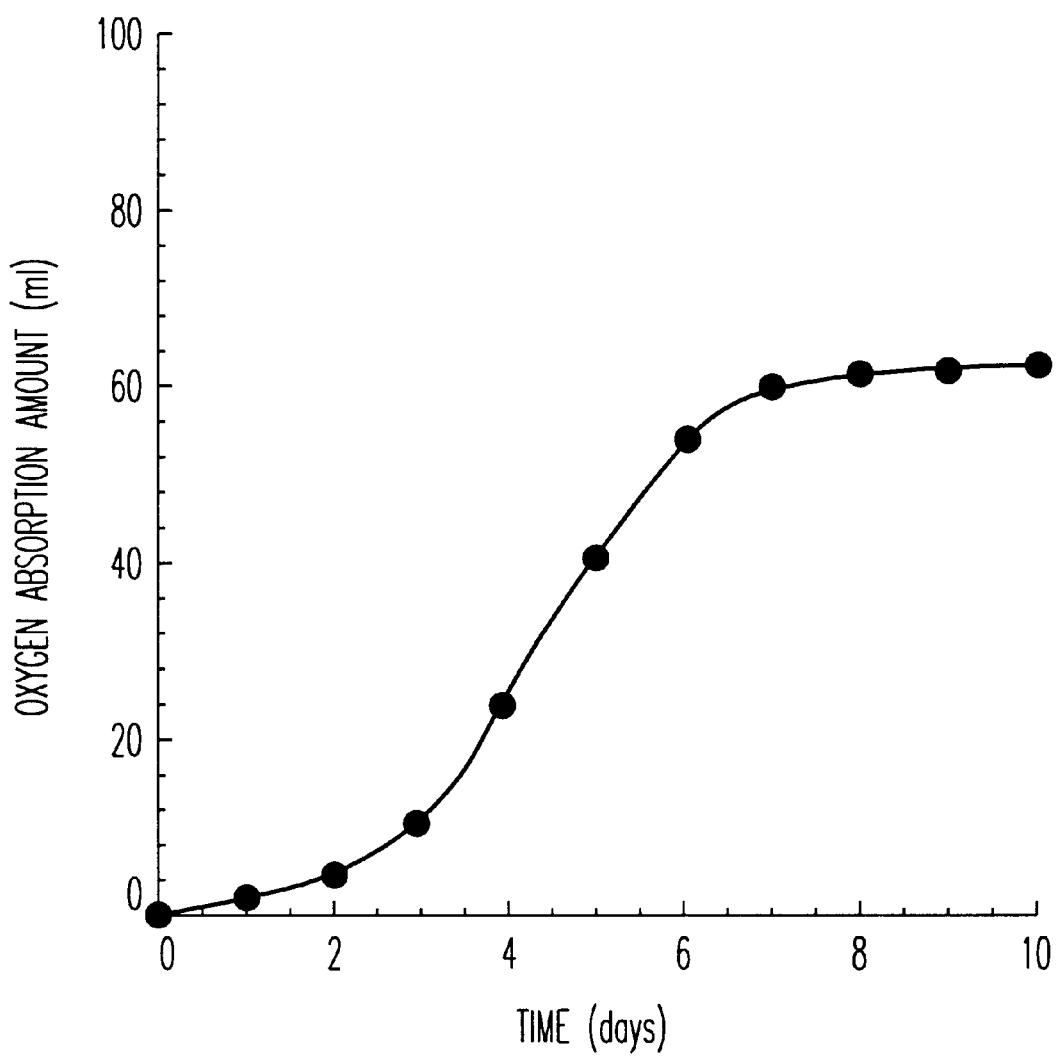
FIG. 3 is a graph plotting the oxygen absorption amount in a pouch made of the multilayered film of Example 1 over time.

A 30 cm×30 cm pouch was produced by laminating two of the above multilayered films and heat-sealing them together so that the oxygen barrier film layer is located closer to the outside and the oxygen absorptive film layer is located closer to the contents inside. The oxygen absorption amount of the resultant pouch was measured, and the results shown in FIG. 3 were obtained.

Example 2

The thermoplastic resin (a) containing an antioxidant was prepared in substantially the same manner as that in Example 1. EVOH, one of the polyvinyl alcohol resin (b1), was used as the gas barrier resin (b). EVOH had an ethylene content of 32 mol %, a degree of saponification of 99.5%, and a melt flow rate (210° C., 2160 g load) of 8.4 g/10 min. The phosphoric acid radical content and the contents of Na, K, and Mg ions of EVOH were measured, and the results were 100 ppm, 20 ppm, 60 ppm, and 20 ppm, respectively. The refractive index of EVOH was measured and found to be 1.533. The oxygen transmission rate of EVOH was 0.4 ml·20 μm/m$^2$·day·atm.

Five parts by weight of the above thermoplastic resin (a), 95 parts by weight of EVOH, and 0.2121 parts by weight of cobalt (II) stearate (0.0200 parts by weight in terms of cobalt atoms) were dry-blended, and the blend was extruded using a 30 mm dia. biaxial extruder (TEX-30SS-30CRW-2V from The Japan Steel Works, Ltd.) under the conditions of a screw rotational speed of 300 rpm and an extruded resin amount of 25 kg/hour at 210° C., and pelletized. The pellets were dried under compression for 16 hours at 30° C., to obtain resin composition pellets. The melt flow rate of the resin composition was 9.5 g/10 min (210° C., 2160 g load). The cutting plane of the resultant resin composition pellet was observed with an electron microscope, and it was found that about 1 μm dia. particles of the ternary block copolymer as the thermoplastic resin (a) were dispersed in a matrix of EVOH.

Figure 4:
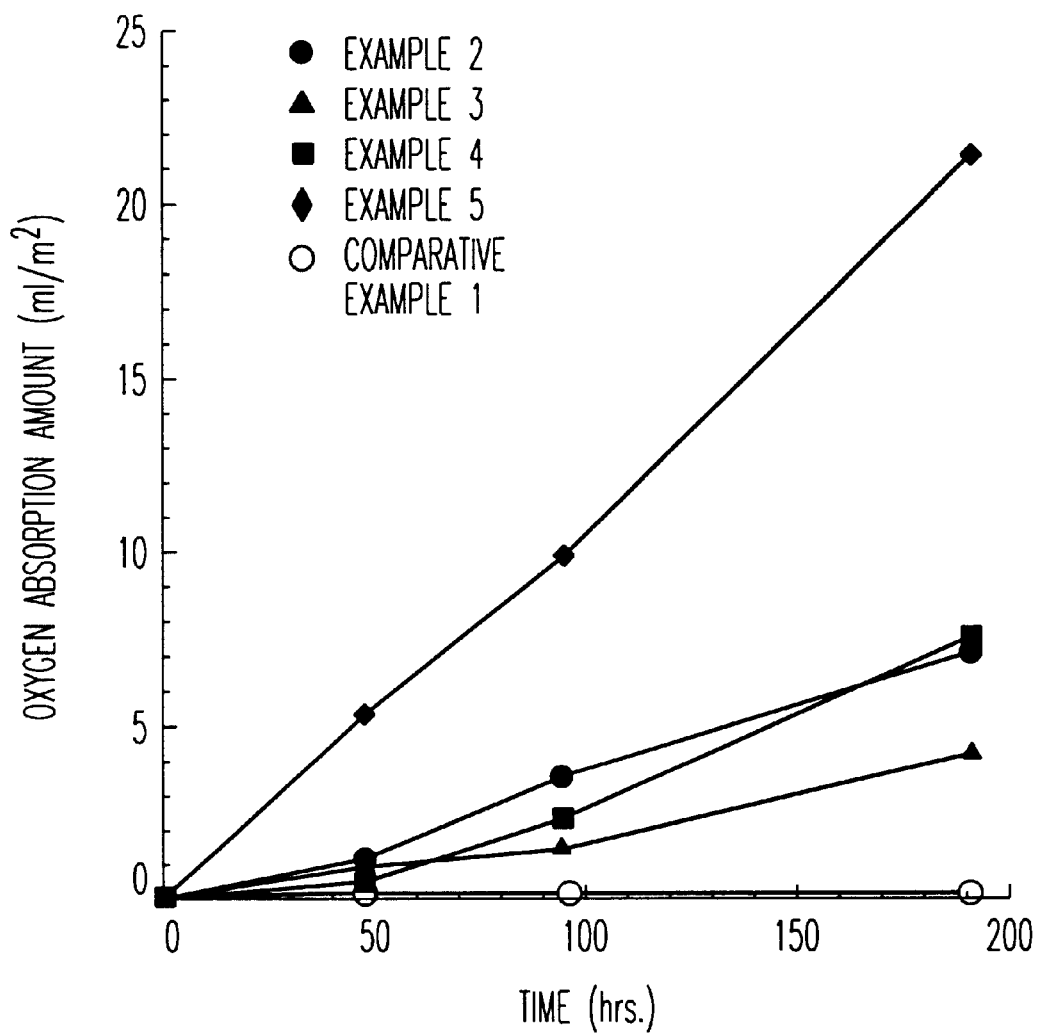
FIG. 4 is a graph plotting the oxygen absorption amounts of resin compositions of Examples 2 to 5 and an EVOH resin of Comparative Example 1 with respect to time.

The resultant resin composition was subjected to extrusion molding at 210° C. to obtain a film having a thickness of 20 μm. The internal haze of the resultant single-layer film was 1.0%. The oxygen absorption amount of the film was measured, and the results shown in FIG. 4 were obtained. The oxygen absorption rate of the resin composition was calculated from the measurement results after two days (48 hours) and eight days (192 hours) (according to the method described under clause (10-2) above), and determined to be 0.498 ml/m²·day.

Figure 5:
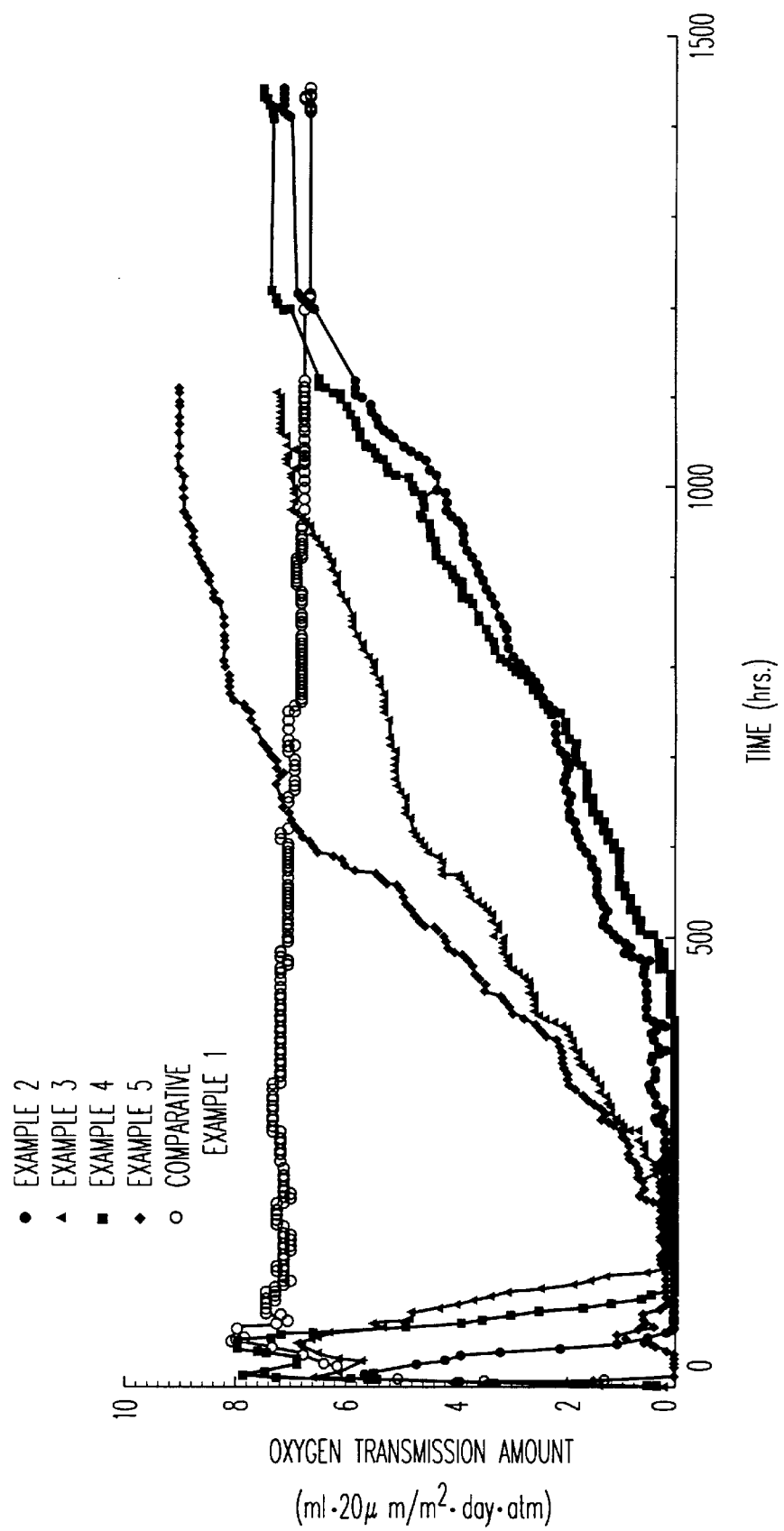
FIG. 5 is a graph plotting the oxygen transmission amounts of multilayered structures of Examples 2 to 5 and Comparative Example 1 with respect to time.

Oriented polypropylene films each having a thickness of 20 μm (OP-#20 U-1 from Tohcello Co., Ltd.) was laminated on both surfaces of the above film made of the resin composition via a urethane adhesive (a toluene/methyl ethyl ketone mixed solution (weight ratio 1:1) of an adhesive (AD335A from Toyo Morton Ltd.) and a curing agent (Cat-10 from Toyo Morton Ltd.)), to obtain a multilayered film. The haze of this multilayered film was 2.3%. The oxygen transmission amount of the multilayered film was measured periodically, and the results shown in FIG. 5 were obtained.

The above resin composition was then subjected to coinjection blow molding, together with a thermoplastic polyester resin described below, to produce a multilayered blow bottle.

The thermoplastic polyester resin was prepared using germanium dioxide as a polymerization catalyst. The contents of respective structural units of the polyester resin (PES) were measured through NMR. As a result, the contents of the terephthalic acid unit, the ethylene glycol unit, and the diethylene glycol unit were 50.0 mol %, 48.9 mol %, and 1.1 mol %, respectively.

The limiting viscosity, the melting point, and the glass transition temperature were 0.83 dl/g, 252° C., and 80° C. respectively.

The coinjection blow molding was performed using a coinjection stretch blow molding machine (ASB-50HT Model from Nissei ASB; for two moldings of 750 ml each), to obtain a two-resin, three-layered parison of PES/resin composition/PES. In this coinjection blow molding, the temperatures were 290° C. in the PES injection zone, 220° C. in the injection zone of the thermoplastic resin composition, 260° C. in the hot runner block in which the two resins are combined, 15° C. in the injection mold core, and 15° C. in the injection mold cavity.

Thereafter, the parison was heated to 105° C. at its surface, and subjected to stretch blow molding to obtain a two-resin, three-layered, coinjection blow molded bottle. In the body part of the bottle, the mean thickness of the inner PES layer, that of the sandwiched layer of the resin composition, and that of the outer PES layer were 200 μm, 20 μm, and 70 μm, respectively.

The haze of the body part of the bottle was measured and found to be 2.7%. The oxygen transmission amount of the bottle ten days after the formation and that after three-month storage were measured, and the results were both 0.00 cc/container·day·atm.

Example 3

The oxygen absorptive resin composition was prepared in substantially the same manner as that in Example 2, using 5 parts by weight of thermoplastic resin (a) obtained in Example 1 and 95 parts by weight of EVOH and 0.1060 parts by weight of cobalt (II) stearate (0.0100 parts by weight in terms of cobalt atoms) used in Example 2. The melt flow rate of the resin composition was 9.3 g/10 min (210° C., 2160 g load). The cutting plane of the resultant resin composition pellet was observed with an electron microscope, and it was found that about 1 μm dia. particles of the ternary block copolymer as the thermoplastic resin (a) were dispersed in a matrix of EVOH.

The resultant resin composition was subjected to extrusion molding at 210° C. to obtain a film having a thickness of 20 μm. The internal haze of the resultant single-layer film was measured and found to be 0.9%. The oxygen absorption amount of the film was measured, and the results shown in FIG. 4 were obtained. The oxygen absorption rate of the resin composition was calculated from the measurement results after two days and eight days (according to the method described under clause (10-2) above), and determined to be 0.280 ml/m²·day.

A multilayered film was then produced in substantially the same manner as that in Example 2. The haze of the resultant multilayered film was 2.2%. The oxygen transmission amount of the multilayered film was measured periodically, and the results shown in FIG. 5 were obtained.

The above resin composition and the same thermoplastic polyester resin as that used in Example 2 were subjected to coinjection blow molding in the manner described in Example 2, to produce a multilayered blow bottle. In this way, a two-resin, three-layered, coinjection blow molded bottle was obtained. In the body part of the bottle, the mean thickness of the inner PES layer, that of the sandwiched layer of the resin composition, and that of the outer PES layer were 200 μm, 20 μm, and 70 μm, respectively.

The haze of the body part of the bottle was measured and found to be 2.6%. The oxygen transmission amount of the bottle ten days after the formation and that after three-month storage were measured, and the results were both 0.00 cc/container·day·atm.

Example 4

The oxygen absorptive resin composition was prepared in substantially the same manner as that in Example 2, using 10 parts by weight of thermoplastic resin (a) obtained in Example 1 and 90 parts by weight of EVOH and 0.2121 parts by weight of cobalt (II) stearate (0.0200 parts by weight in terms of cobalt atoms) used in Example 2. The melt flow rate of the resin composition was 9.0 g/10 min (210° C., 2160 g load). The cutting plane of the resultant resin composition pellet was observed with an electron microscope, and it was found that about 1 μm dia. particles of the ternary block copolymer as the thermoplastic resin (a) were dispersed in a matrix of EVOH.

The resultant resin composition was subjected to extrusion molding at 210° C. to obtain a film having a thickness of 20 μm. The oxygen absorption amount of the film was measured, and the results shown in FIG. 4 were obtained. The oxygen absorption rate of the resin composition was calculated from the measurement results after two days and eight days (according to the method described under clause (10-2) above), and determined to be 0.595 ml/m²·day.

A multilayered film was then produced in substantially the same manner as that in Example 2. The oxygen transmission amount of the multilayered film was measured periodically, and the results shown in FIG. 5 were obtained.

The above resin composition and the same thermoplastic polyester resin as that used in Example 2 were subjected to coinjection blow molding in the manner described in Example 2, to produce a multilayered blow bottle. A two-resin, three-layered, coinjection blow molded bottle was obtained. In the body part of the bottle, the mean thickness of the inner PES layer, that of the sandwiched layer of the resin composition, and that of the outer PES layer were 200 μm, 20 μm, and 70 μm, respectively.

The oxygen transmission amount of the bottle ten days after the formation and that after a three-month storage were measured, and the results were both 0.00 cc/container·day·atm.

Example 5

The oxygen absorptive resin composition was prepared in substantially the same manner as that in Example 2, using 5 parts by weight of thermoplastic resin (a) obtained in Example 1, 95 parts by weight of EVOH having an ethylene content of 44 mol %, a degree of saponification of 99.5%, a melt flow rate (210° C., 2160 g load) of 13.0 g/10 min, a refractive index of 1.528, and an oxygen transmission rate of 1.5 ml·20 $\mu$m/m$^2$·day·atm, and 0.2121 parts by weight of cobalt (II) stearate (0.0200 parts by weight in terms of cobalt atoms). The melt flow rate of the resin composition was 10.5 g/10 min (210° C., 2160 g load). The cutting plane of the resultant resin composition pellet was observed with an electron microscope, and it was found that about 1 $\mu$m dia. particles of the ternary block copolymer as the thermoplastic resin (a) were dispersed in a matrix of EVOH.

The resultant resin composition was subjected to extrusion molding at 210° C. to obtain a film having a thickness of 20 $\mu$m. The internal haze of the resultant single-layer film was measured and found to be 1.7%. The oxygen absorption amount of the film was measured, and the results shown in FIG. 4 were obtained. The oxygen absorption rate of the resin composition was calculated from the measurement results after two days and eight days (according to the method described under clause (10-2) above), and determined to be 1.344 ml/m$^2$·day.

A multilayered film was then produced in substantially the same manner as that in Example 2. The haze of the resultant multilayered film was 2.9%. The oxygen transmission amount of the multilayered film was measured periodically, and the results shown in FIG. 5 were obtained.

The above resin composition and the same thermoplastic polyester resin as that used in Example 2 were subjected to coinjection blow molding in the manner described in Example 2, to produce a multilayered blow bottle. A two-resin, three-layered, coinjection blow molded bottle was obtained. In the body part of the bottle, the mean thickness of the inner PES layer, that of the sandwiched layer of resin composition, and that of the outer PES layer were 200 $\mu$m, 20 $\mu$m, and 70 $\mu$m, respectively.

The haze of the body part of the bottle was measured and found to be 3.3%. The oxygen transmission amount of the bottle ten days after the formation and that after a three-month storage were measured, and the results were both 0.00 cc/container·day·atm.

Comparative Example 1

The EVOH resin used in Example 2 only was subjected to extrusion molding at a 210° C. to obtain a film having a thickness of 20 $\mu$m. The internal haze of the resultant single-layer film was measured and found to be 0.7%. The oxygen absorption amount of the film was measured, and the results shown in FIG. 4 were obtained. The oxygen absorption rate of the resin composition was calculated from the measurement results after two days and eight days, and determined to be 0.000 ml/m$^2$·day.

A multilayered film was then produced in substantially the same manner as that in Example 2. The haze of the resultant multilayered film was 2.0%. The oxygen transmission amount of the multilayered film was measured periodically, and the results shown in FIG. 5 were obtained.

The above EVOH resin and the same thermoplastic polyester resin as that used in Example 2 were subjected to coinjection blow molding in the manner described in Example 2, to produce a multilayered blow bottle. A two-resin, three-layered, coinjection blow molded bottle was obtained. In the body part of the bottle, the mean thickness of the inner PES layer, that of the sandwiched layer of EVOH, and that of the outer PES layer were 200 $\mu$m, 20 $\mu$m, and 70 $\mu$m, respectively.

The haze of the body part of the bottle was measured and found to be 2.4%. The oxygen transmission amount of the bottle ten days after the formation and that after a three-month storage were measured, and the results were both 0.02 cc/container·day·atm.

The results of the above tests are shown in Table 1 below.

TABLE 1

| | Thermoplastic resin (a) Amount (parts by weight) | Gas barrier resin (b) | | Transition metal salt (c) Amount (ppm) | Resin composition | | Multilayered film Haze (%) | Multilayered bottle | |
|---|---|---|---|---|---|---|---|---|---|
| | | Ethylene content (mol %) | Amount (parts by weight) | | Oxygen absorption rate (ml/m$^2$ · day) | Haze (%) | | Oxygen transmission amount *1) | Haze (%) |
| Example 2 | 5 | 32 | 95 | 200 | 0.498 | 1.0 | 2.3 | 0.00 | 2.7 |
| Example 3 | 5 | 32 | 95 | 100 | 0.280 | 0.9 | 2.2 | 0.00 | 2.6 |
| Example 4 | 10 | 32 | 90 | 200 | 0.595 | — | — | 0.00 | — |
| Example 5 | 5 | 44 | 95 | 200 | 1.344 | 1.7 | 2.9 | 0.00 | 3.3 |
| Comparative example 1 | 0 | 32 | 100 | 0 | 0.000 | 0.7 | 2.0 | 0.02 | 2.4 |

*1)ml/container · day · atm

Example 6

The thermoplastic resin (a) containing an antioxidant was prepared in substantially the same manner as that in Example 1. Polycaproamide (1030B from Ube Industries, Ltd.) was used as the gas barrier resin (b). The refractive index of the polycapromamide was 1.533, and the oxygen transmission rate thereof was 80 ml·20 $\mu$m/m$^2$·day·atm.

Five parts by weight of the above thermoplastic resin (a), 95 parts by weight of polycaproamide, and 0.2121 parts by weight of cobalt (II) stearate (0.0200 parts by weight in terms of cobalt atoms) were dry-blended, and the blend was extruded using a 30 mm dia. biaxial extruder (TEX-30SS-30CRW-2V from The Japan Steel Works, Ltd.) under the conditions of a screw rotational speed of 300 rpm and an extruded resin amount of 25 kg/hour at 260° C., and pelletized. The obtained pellets were dried under reduced pressure for 16 hours at 30° C., to obtain resin composition pellets. The cutting plane of the resultant resin composition pellet was observed using electron microscope, and it was found that about 1 $\mu$m dia. particles of the ternary block copolymer as the thermoplastic resin (a) were dispersed in a matrix of polycaproamide.

Figure 6:
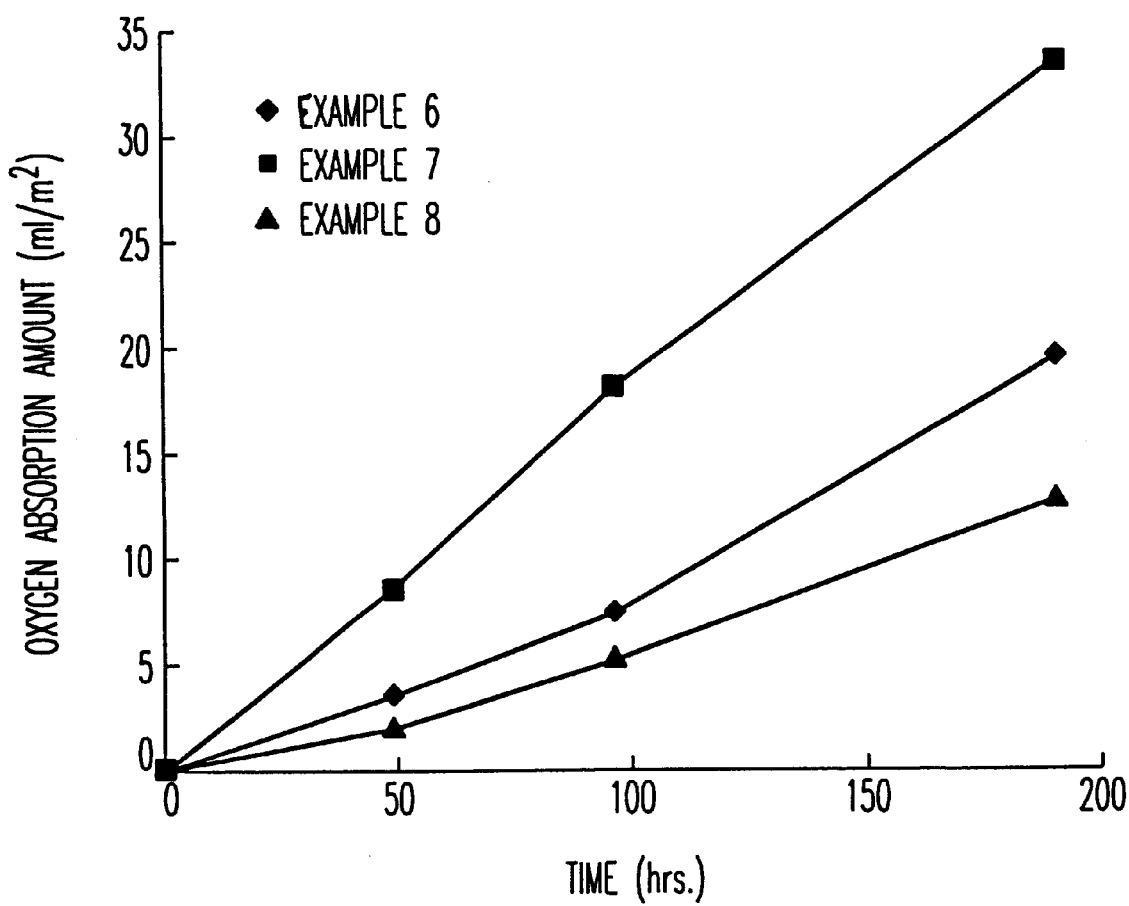
FIG. 6 is a graph plotting the oxygen absorption amounts of resin compositions of Examples 6 to 8 with respect to time.

The resultant resin composition was subjected to extrusion molding at 260° C. to obtain a film having a thickness of 20 μm. The internal haze of the film was measured and found to be 1.2%. The oxygen absorption amount of the film was measured, and the results shown in FIG. 6 were obtained. The oxygen absorption rate of the resin composition was calculated from the measurement results after two days (48 hours) and eight days (192 hours) (according to the method described under clause (10-2) above), and determined to be 2.618 ml/n²·day.

Oriented polypropylene films each having a thickness of 20 μm (OP-#20 U-1 from Tohcello Co., Ltd.) was laminated on both surfaces of the film made of the resin composition via a urethane adhesive (a toluene/methyl ethyl ketone mixed solution (weight ratio 1:1) of an adhesive (AD335A from Toyo Morton Ltd.) and a curing agent (Cat-10 from Toyo Morton Ltd.)), to obtain a multilayered film. The haze of this multilayered film was 2.4%. The oxygen transmission amount of the multilayered film was measured four days after the film formation, and found to be 6.8 ml·20 μm/m²·day·atm.

The above resin composition and the same thermoplastic polyester resin as that used in Example 2 were then subjected to coinjection blow molding, to produce a multilayered blow bottle.

The coinjection blow molding was performed using a coinjection stretch blow molding machine (ASB-50HT Model from Nissei ASB; for two moldings of 750 ml each), to obtain a two-resin, three-layered parison of PES/resin composition/PES. In this coinjection blow molding, the temperatures were 290° C. in the PES injection zone, 260° C. in the injection zone of the thermoplastic resin composition, 280° C. in the hot runner block in which the two resins are combined, 15° C. in the injection mold core, and 15° C. in the injection mold cavity.

Thereafter, the parison was heated to 105° C. at its surface, and subjected to stretch blow molding to obtain a two-resin, three-layered, coinjection blow molded bottle. In the body part of the bottle, the mean thickness of the inner PES layer, that of the sandwiched layer of the resin composition, and that of the outer PES layer were 200 μm, 20 μm, and 70 μm, respectively.

The haze of the body part of the bottle was measured and found to be 2.7%. The oxygen transmission amount of the bottle was also measured and found to be 0.02 cc/container·day·atm.

Example 7

The thermoplastic resin (a) containing an antioxidant was prepared in substantially the manner as that in Example 1. Polyvinyl chloride (ESMEDICA V6142E from Sekisui Chemical Co., Ltd.) was used as the gas barrier resin (b). The refractive index of the polyvinyl chloride was 1.535, and the oxygen transmission rate thereof was 160 ml·20 μm/m²·day·atm.

Five parts by weight of the above thermoplastic resin (a), 95 parts by weight of polyvinyl chloride, and 0.2121 parts by weight of cobalt (II) stearate (0.0200 parts by weight in terms of cobalt atoms) were dry-blended, and the blend was extruded using a 30 mm dia. biaxial extruder (TEX-30SS-30CRW-2V from The Japan Steel Works, Ltd.) under the conditions of a screw rotational speed of 300 rpm and an extruded resin amount of 25 kg/hour at 160° C., and pelletized. The obtained pellets were dried under reduced pressure for 16 hours at 30° C., to obtain resin composition pellets. The cutting plane of the resultant resin composition pellet was observed using electron microscope, and it was found that about 2 μm dia. particles of the ternary block copolymer as the thermoplastic resin (a) were dispersed in a matrix of polyvinyl chloride.

The resultant resin composition was subjected to extrusion molding at 160° C. to obtain a film having a thickness of 20 μm. The internal haze of the single-layer film was measured and found to be 2.9%. The oxygen absorption amount of the film was measured, and the results shown in FIG. 6 were obtained. The oxygen absorption rate of the resin composition was calculated from the measurement results after two days (48 hours) and eight days (192 hours) (according to the method described under clause (10-2) above), and determined to be 4.105 ml/m²·day.

A multilayered film was produced in substantially the same manner as that in Example 6. The haze of this multilayered film was 3.5%. The oxygen transmission amount of the multilayered film was measured four days after the film formation, and found to be 12.8 ml·20 μm/m²·day·atm.

Example 8

The thermoplastic resin (a) containing an antioxidant was prepared in substantially the same manner as that in Example 1. Polyacrylonitrile (BAREX 1000 from Mitsui Chemical Co., Ltd.) was used as the gas barrier resin (b). The refractive index of the polyacrylonitrile was 1.525 and the oxygen transmission rate thereof was 6.9 ml·20 μm/m²·day atm.

Five parts by weight of the above thermoplastic resin (a), 95 parts by weight of polyacrylonitrile, and 0.2121 parts by weight of cobalt (II) stearate (0.0200 parts by weight in terms of cobalt atoms) were dry-blended, and the blend was extruded using a 30 mm dia. biaxial extruder (TEX-30SS-30CRW-2V from The Japan Steel Works, Ltd.) under the conditions of a screw rotational speed of 300 rpm and an extruded resin amount of 25 kg/hour at 200° C., and pelletized. The obtained pellets were dried under reduced pressure for 16 hours at 30° C., to obtain resin composition pellets. The cutting plane of the resultant resin composition pellet was observed using electron microscope, and it was found that about 2 μm dia. particles of the ternary block copolymer as the thermoplastic resin (a) were dispersed in a matrix of polyacrylonitrile.

The resultant resin composition was subjected to extrusion molding at 200° C. to obtain a film having a thickness of 20 μm. The internal haze of the single film was measured and found to be 4.9%. The oxygen absorption amount of the film was measured, and the results shown in FIG. 6 were obtained. The oxygen absorption rate of the resin composition was calculated from the measurement results after two days (48 hours) and eight days (192 hours) (according to the method described under clause (10-2) above), and determined to be 1.770 ml/m²·day.

A multilayered film was produced in substantially the same manner as that in Example 6. The haze of this multilayered film was 6.5%. The oxygen transmission amount of the multilayered film was measured four days after the film formation, and found to be 0.7 ml·20 μm/m²·day·atm.

The results of the above tests are shown in Table 2 below.

TABLE 2

| | Thermoplastic resin (a) | Gas barrier resin (b) | | Transmission metal salt (c) | Resin composition | | Multilayered film | | Multilayered bottle | |
|---|---|---|---|---|---|---|---|---|---|---|
| | | | | | Oxygen absorption | | Oxygen transmission | | Oxygen transmission | |
| | Amount (parts by weight) | Compound | Amount (parts by weight) | Amount (ppm) | rate ml/m² · day | Haze (%) | amount *4) | Haze (%) | amount *5) | Haze (%) |
| Example 6 | 5 | *1) | 95 | 200 | 2.618 | 1.2 | 6.8 | 2.4 | 0.02 | 2.7 |
| Example 7 | 5 | *2) | 95 | 200 | 4.105 | 2.9 | 12.8 | 3.5 | — | — |
| Example 8 | 5 | *3) | 95 | 200 | 1.77 | 4.9 | 0.7 | 6.5 | — | — |

*1)Poly ∈-caprolactam
*2)Polyvinyl chloride
*3)Polyacrylonitrile
*4)ml · 20 μm/m² · day · atm
*5)ml/container · day · atm Example 9

The multilayered film produced in Example 1 was stamped into the shape of a gasket that fits a polypropylene screw cap body having an outer diameter of 65 mm and a bottom thickness of 1.2 mm. The resultant gasket-shaped film was attached to the screw cap body so that the layered structure of [oriented polypropylene film layer/urethane adhesive layer/oxygen barrier film layer/urethane adhesive layer/oxygen absorptive film layer/urethane adhesive layer/ oriented polypropylene film layer] be positioned with the oxygen barrier film layer being closer to the cap body and the oxygen absorptive film layer being closer to the contents. The resultant cap equipped with the gasket was supplied to a mold of a gasket molding machine for compression molding, and then ethylene-1-butene copolymer (POLYBUTYLENE 8240 from Shell Chemical; a copolymer of 1-butene (99 mol % or more) and ethylene (1 mol % or less) having a density of 0.908 g/cm³ and MFR of 2.0 g/10 min (210° C., 2160 g load)) was supplied to the gasket molding machine for compression molding, to produce a cap equipped with a multilayered gasket. The temperatures at the cylinder, nozzle, and mold of the compression molding machine were adjusted to be 245° C., 235° C., and 30° C., respectively.

The sealing properties of the thus-produced cap were evaluated in the following manner.

Water, 200 ml, was put into a 500 ml cylindrical polyester blow bottle and covered with the screw cap. The cap was fastened in various fashions as described below. The bottle was then grasped by the body part and shaken up and down vigorously 20 times. The resultant state of leakage was evaluated on a scale of four levels as follows.

A: No leaking observed at all by light fastening with the fingertips.
B: Leaking observed by light fastening with the fingertips, moistening part of the cap screw.
C: Leaking observed by light fastening with the fingertips, water splashing outside the cap, but no leaking observed by firmly fastening.
D: Leaking observed by firm fastening.

The bottle was evaluated as "A", proving its good sealing properties.

Example 10

The multilayered film obtained in Example 2 was tested in the same manner as that described in Example 9. As a result, it was evaluated as "A".

Example 11

The multilayered film obtained in Example 6 was tested in the same manner as that described in Example 9. As a result, it was evaluated as "A".

Thus, the present invention provides resins or resin compositions having good oxygen absorbency. The resins or resin compositions can be easily handled and produced into molded articles of an arbitrary shape. The resultant molded articles such as films and containers have good oxygen absorbency and gas barrier properties. They can also provide good transparency if resins are appropriately selected. Therefore, the resins or resin compositions of the present invention are useful as containers for preserving materials susceptible to degradation by oxygen, such as foods and medicines. They are also useful as a deoxidizer in the light of their oxygen scavenging function and ease of handling.

Multilayered structures using the above resins or resin compositions, such as packages made of a multilayered film, are also favorably used due to their excellent performance. In particular, containers made of a multilayered film having a total thickness of 300 μm or less, and multilayered containers including a thermoplastic polyester layer laminated with the resin or resin composition layer are favorably used for applications that require transparency as well as good oxygen absorbency and gas barrier properties.

While the invention has been described in detail and with reference to specific embodiments thereof, it will be apparent to one skilled in the art that various changes and modifications can be made therein without departing from the spirit and scope thereof.

The present application is based on Japanese Applications No. 11-55264, filed Mar. 3, 1999; No. 11-161190, filed Jun. 8, 1999; No. 11-161191, filed Jun. 8, 1999; No. 11-212086, filed Jul. 27, 1999; No. 11-218669, filed Aug. 2, 1999; No. 11-220288, filed Aug. 3, 1999; the entire contents of each being incorporated herein by reference thereto.

What is claimed is:

1. An oxygen absorptive resin composition comprising:
   a thermoplastic resin (a) having carbon-carbon double bonds;
   a gas barrier resin (b) having an oxygen transmission rate at 20° C. and 65% relative humidity, of 500 ml·20 μm/m²·day·atm or less; and
   a transition metal salt (c);
   wherein the gas barrier resin (b) is at least one selected from the group consisting of polyvinyl alcohol resins, polyamides, and polyacrylonitrile,
   wherein the thermoplastic resin (a) is contained in an amount of 0.1 to 30% by weight, and the gas barrier resin (b) is contained in an amount of 99.9 to 70% by weight, and
   wherein the thermoplastic resin (a) is in the form of particles, the particles are dispersed in a matrix of the gas barrier resin (b), and the size of the particles is less than 10 μm.

2. The resin composition as claimed in claim 1, wherein the oxygen absorption rate of a film having a thickness of 20 µm formed from the composition is 0.01 ml/m² day· or more.

3. The resin composition as claimed in claim 1, wherein the thermoplastic resin (a) has the carbon-carbon double bonds in an amount of 0.0001 eq/g or more.

4. The resin composition as claimed in claim 1, wherein the thermoplastic resin (a) is a copolymer of an aromatic vinyl compound and a diene compound.

5. The resin composition as claimed in claim 1, wherein the thermoplastic resin (a) has at least one kind of structural unit represented by formula (I):

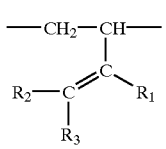

[wherein $R_1$ denotes an alkyl group having 1 to 10 carbon atoms, an aryl group, an alkylaryl group, or an alkoxy group; $R_2$ and $R_3$ denote independently a hydrogen atom, an alkyl group having 1 to 10 carbon atoms, a substituted aryl group or a non-substituted aryl group, —$COOR_4$, —$OCOR_5$, a cyano group, or a halogen atom; and $R_4$ and $R_5$ denote independently an alkyl group having 1 to 10 carbon atoms, an aryl group, an alkylaryl group, or an alkoxy group], and has a number-average molecular weight in the range of 1000 to 500000.

6. The resin composition as claimed in claim 1, wherein the refractive index of the gas barrier resin (b) is in the range of 1.50 to 1.56.

7. The resin composition as claimed in claim 1, wherein the gas barrier resin (b) is an ethylene-vinyl alcohol copolymer having an ethylene content of 5 to 60 mol % and a degree of saponification of 90% or more.

8. The resin composition as claimed in claim 1, wherein the transition metal salt (c) is at least one selected from the group consisting of iron salts, nickel salts, copper salts, manganese salts, and cobalt salts.

9. The resin composition as claimed in claim 1, wherein the transition metal salt (c) is contained in an amount of 1 to 5000 ppm in terms of the metal element.

10. The resin composition as claimed in claim 1, wherein the difference in the refractive index between the thermoplastic resin (a) and the gas barrier resin (b) is 0.01 or less.

11. A molded article comprising the oxygen absorptive resin composition as claimed in claim 1.

12. A multilayered structure having a layer including the oxygen absorptive resin composition as claimed in claim 1.

13. A multilayered container having a layer including the oxygen absorptive resin composition as claimed in claim 1.

14. A multilayered container comprising a multilayered film having a layer made of the.oxygen absorptive resin composition as claimed in claim 1, wherein the multilayered film has a total thickness of 300 µm or less.

15. A multilayered container having a layer made of the oxygen absorptive resin composition as claimed in claim 1 and a layer made of thermoplastic polyester.

16. A cap equipped with a gasket made of the oxygen absorptive resin composition as claimed in claim 1.

17. The composition of claim 1, wherein the mean size of the particles is 5 µm or less.

* * * * *